(12) United States Patent
Rust et al.

(10) Patent No.: US 6,968,538 B2
(45) Date of Patent: Nov. 22, 2005

(54) SYSTEM AND METHODS FOR INTEGRATION OF CUSTOM CLASSES INTO PRE-EXISTING OBJECTS MODELS

(75) Inventors: William C. Rust, Sunnyvale, CA (US); Dennis W. Worthem, Campbell, CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 838 days.

(21) Appl. No.: 09/872,608

(22) Filed: Jun. 1, 2001

(65) Prior Publication Data

US 2002/0199031 A1 Dec. 26, 2002

(51) Int. Cl.[7] .................................................. G06F 9/44
(52) U.S. Cl. ........................ 717/108; 719/316; 345/762
(58) Field of Search .............................. 719/315, 316; 717/100, 104, 108, 116, 144, 165; 345/594, 700, 762

(56) References Cited

U.S. PATENT DOCUMENTS

| | | | | |
|---|---|---|---|---|
| 4,862,345 A | | 8/1989 | Lekron ........................ 364/188 |
| 4,965,743 A | | 10/1990 | Malin et al. ................. 364/513 |
| 5,008,810 A | | 4/1991 | Kessel et al. ............... 364/200 |
| 5,398,336 A | | 3/1995 | Tantry et al. ............... 395/600 |
| 5,446,842 A | | 8/1995 | Schaeffer et al. ...... 935/200.01 |
| 5,544,297 A | | 8/1996 | Milne et al. ................. 395/154 |
| 5,551,035 A | * | 8/1996 | Arnold et al. .............. 719/315 |
| 5,583,983 A | * | 12/1996 | Schmitter .................... 717/138 |
| 5,604,892 A | | 2/1997 | Nuttall et al. ............... 395/500 |
| 5,627,979 A | * | 5/1997 | Chang et al. ............... 345/763 |
| 5,634,129 A | | 5/1997 | Dickinson ................... 395/683 |
| 5,650,941 A | * | 7/1997 | Coelho et al. .............. 345/619 |
| 5,680,619 A | * | 10/1997 | Gudmundson et al. ..... 717/108 |
| 5,717,877 A | | 2/1998 | Orton et al. ................. 395/326 |
| 5,764,897 A | | 6/1998 | Khalidi ................... 395/200.31 |
| 5,768,505 A | | 6/1998 | Gilchrist et al. ........ 395/200.31 |
| 5,778,378 A | | 7/1998 | Rubin ......................... 707/103 |
| 5,781,732 A | | 7/1998 | Adams ................... 395/200.35 |
| 5,787,283 A | | 7/1998 | Chin et al. ................... 395/701 |
| 5,787,425 A | | 7/1998 | Bigus ............................ 707/6 |
| 5,794,001 A | | 8/1998 | Malone et al. .............. 395/342 |
| 5,822,587 A | * | 10/1998 | McDonald et al. ......... 717/108 |

(Continued)

OTHER PUBLICATIONS

Microsoft Corporation, "Programmer's Guide, Microsoft Visual Basic for Applications 6.0, Software Development Kit", (2000), pps. 39–61, 83–99.

(Continued)

*Primary Examiner*—St. John Courtenay III
*Assistant Examiner*—Van H. Nguyen

(57) ABSTRACT

Computer-implemented methods, systems and apparatus implement techniques for generating custom coclasses. A runtime environment includes a client application implementing an object model, which includes a hierarchy of object classes that can be instantiated in the client application. The object model includes class templates, each having an associated class type, and includes class functionality information—including required class functionality and elective class functionality—for custom classes that can be implemented in the client application. When a user requests the creation of a custom class of a specified type, a design-time environment is launched and class functionality information is retrieved for a class template associated with the type. A custom class is created, based on a class definition defining a class having the required class functionality and the specified elective class functionality. Objects belonging to the custom class can be instantiated from the runtime environment independent of the design-time environment.

25 Claims, 27 Drawing Sheets

U.S. PATENT DOCUMENTS

| | | | | |
|---|---|---|---|---|
| 5,867,709 A | * | 2/1999 | Klencke | 717/111 |
| 5,878,432 A | | 3/1999 | Misheski et al. | 707/103 |
| 5,936,860 A | | 8/1999 | Arnold et al. | 364/468.01 |
| 6,061,515 A | * | 5/2000 | Chang et al. | 717/114 |
| 6,083,276 A | | 7/2000 | Davidson et al. | 717/1 |
| 6,226,783 B1 | * | 5/2001 | Limondin et al. | 717/104 |
| 6,263,492 B1 | * | 7/2001 | Fraley et al. | 717/107 |
| 6,266,805 B1 | | 7/2001 | Nwana et al. | 717/4 |
| 6,314,555 B1 | | 11/2001 | Ndumu et al. | 717/1 |
| 6,618,852 B1 | | 9/2003 | van Eikeren et al. | 717/108 |

OTHER PUBLICATIONS

Microsoft Corporation, "Adding Objects and Controls", MSDN Library, (2001) 8 pages.

Microsoft Corporation, "Adding a New Interface to an Existing Object or Control", MSDN Library, (2001) 4 pages.

Microsoft Automation and Extensibility Overview, Feb. 2002, downloaded on Aug. 18, 2004 from: msdn.microsof.com/library/en–us/dv vstecha...soriAutomationExten- sibilityOverview.asp?frame=true.

Microsoft Writing Custom Designers for .NET Components, Jun. 2001, downloaded on Aug. 18, 2004 from: //msdn.microsoft.com/library/en–us/dndotnet/html/custdsgnrdotnet.asp?frame=true.

Houstis et al., "The Architecture of a Software Framework for Building Problem Solving Environments for PDE Based Applications", Dept. of Computer Sciences Purdue University, May 14, 1997.

Pirklbauer et al., "Object–Oriented Process Control Software", Journal of Object–Oriented Programming, May 1994.

Pomberger et al., "The Role of Prototyping in Software Development", 1994.

Weinreich et al., "The Communication Facilities of the Process Talk Application Framework", OOPSLA 1994 Workshop.

Microsoft Creating Components in .NET, Feb. 2002, downloaded on Aug. 18, 2004 from: msdn.microsof.com/library/en–us/dpdotnet/html/componentsnet.asp?frame=true.

Microsoft Building A Custom Project Wizard in Visual Studio .NET, May 2003, downloaded on Aug. 18, 2004 from: //msdn.microsof.com/library/en–us/dv vstechart/html/customprojectwiz.asp!frame=true.

Pirklbauer et al., "Process Talk: An Object Oriented Framework for Distributed Automation Software", 1992.

Pirklbauer et al., "Libraries and Tools for Object–Oriented Distributed Automation Software", 1993.

Pirklbauer et al., "Object–Oriented and Conventional Process Automated Systems", 1994.

* cited by examiner

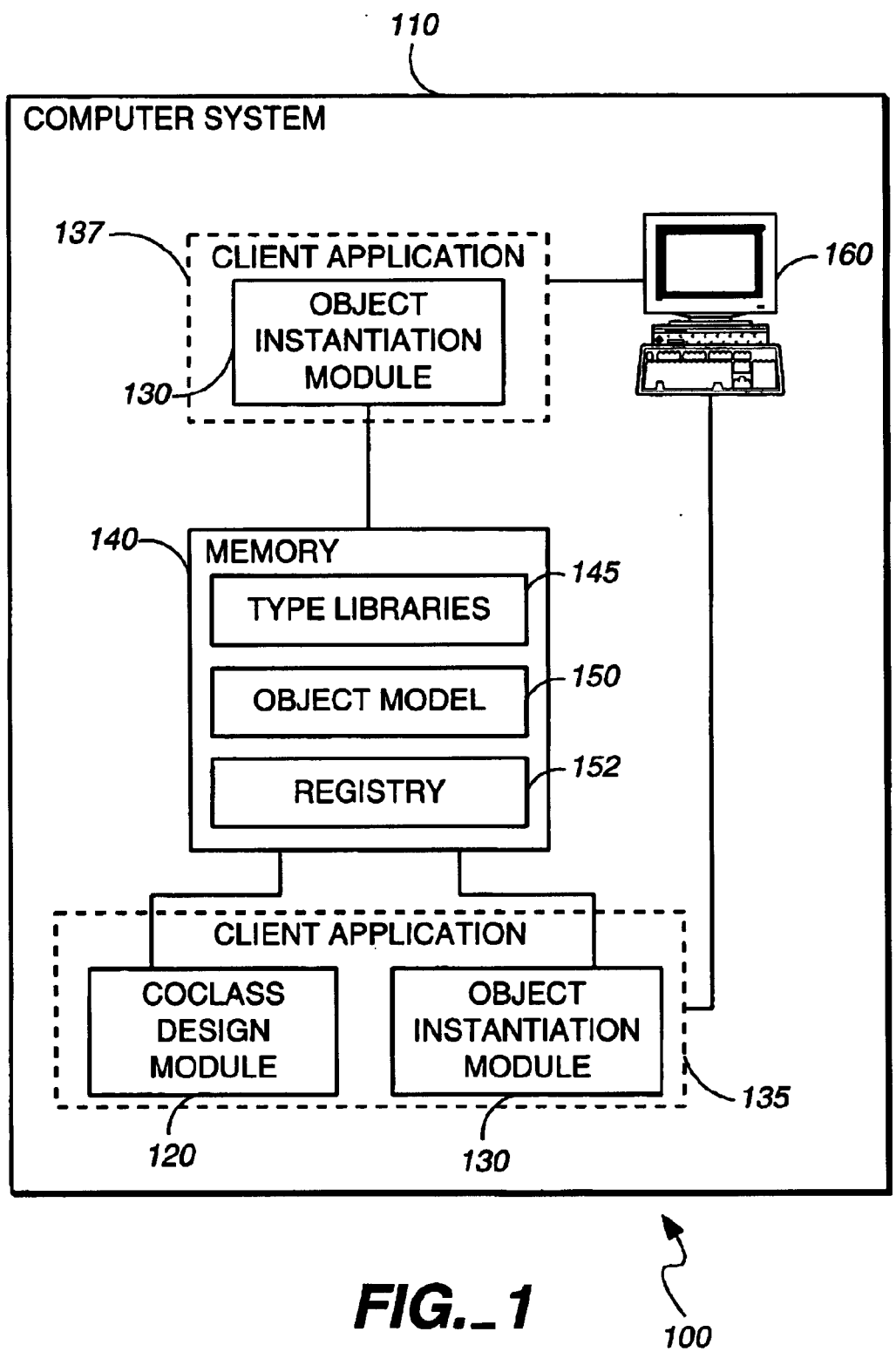
FIG._1

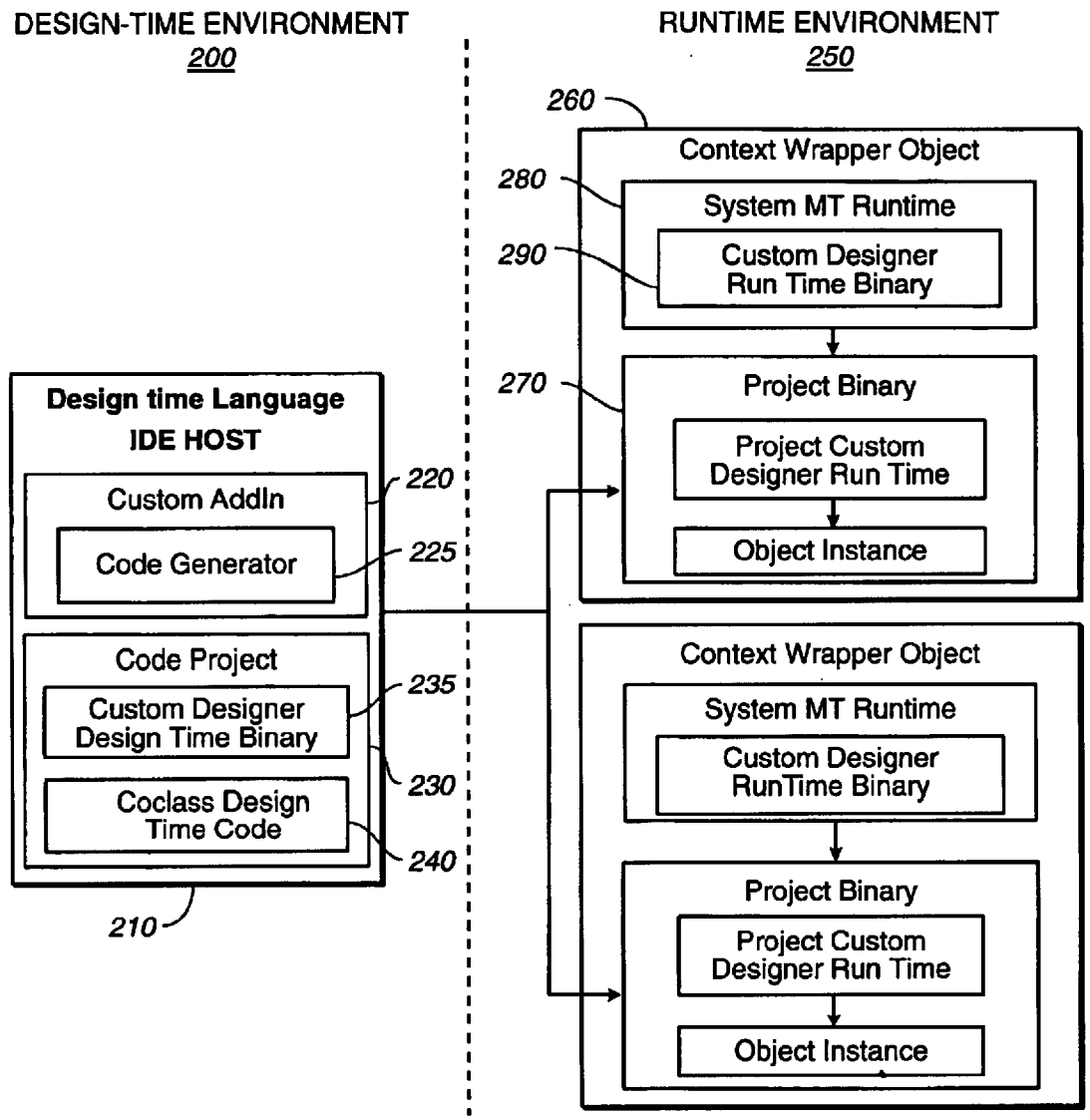
FIG._2

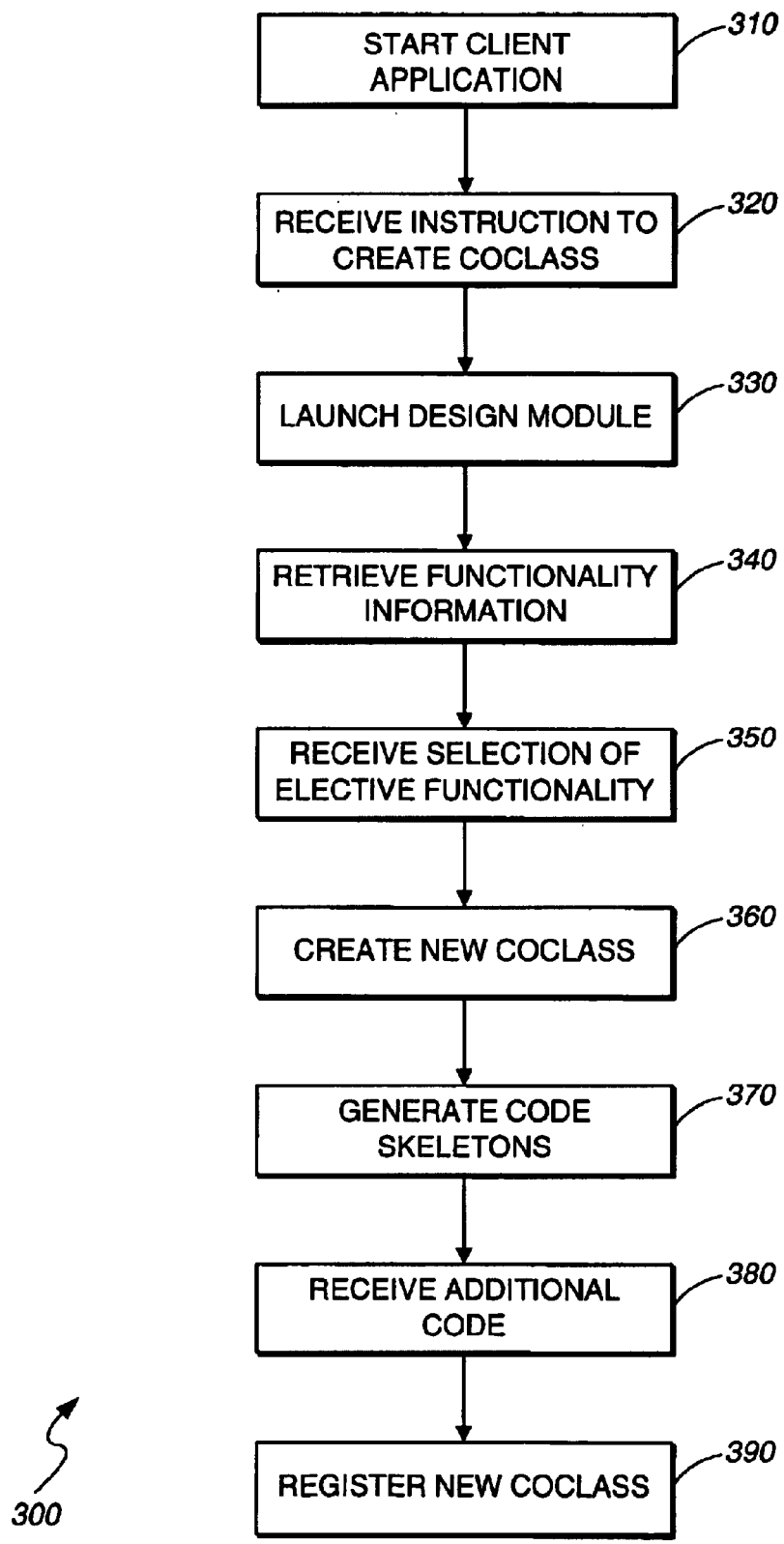
FIG._3

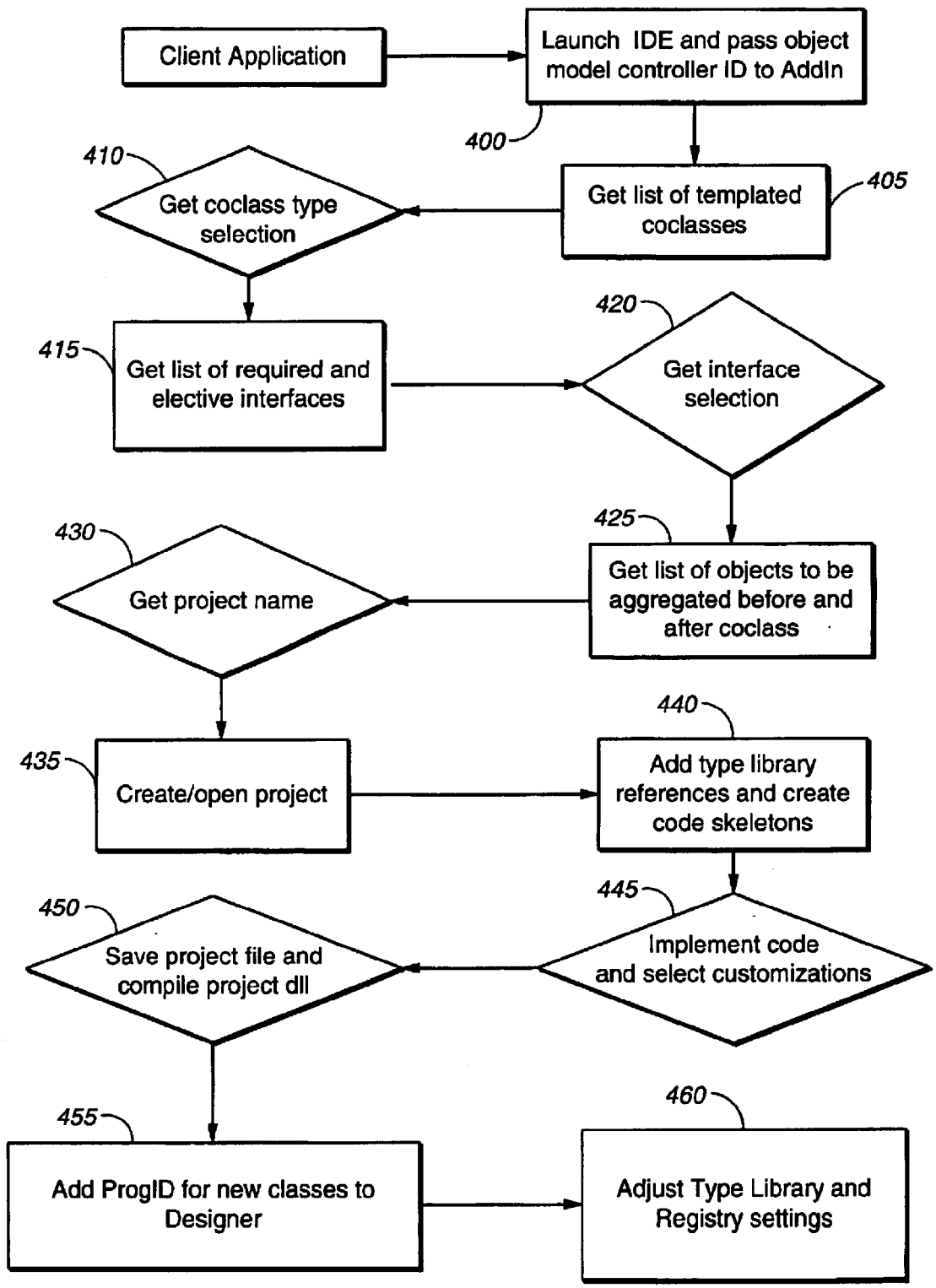
FIG._4A

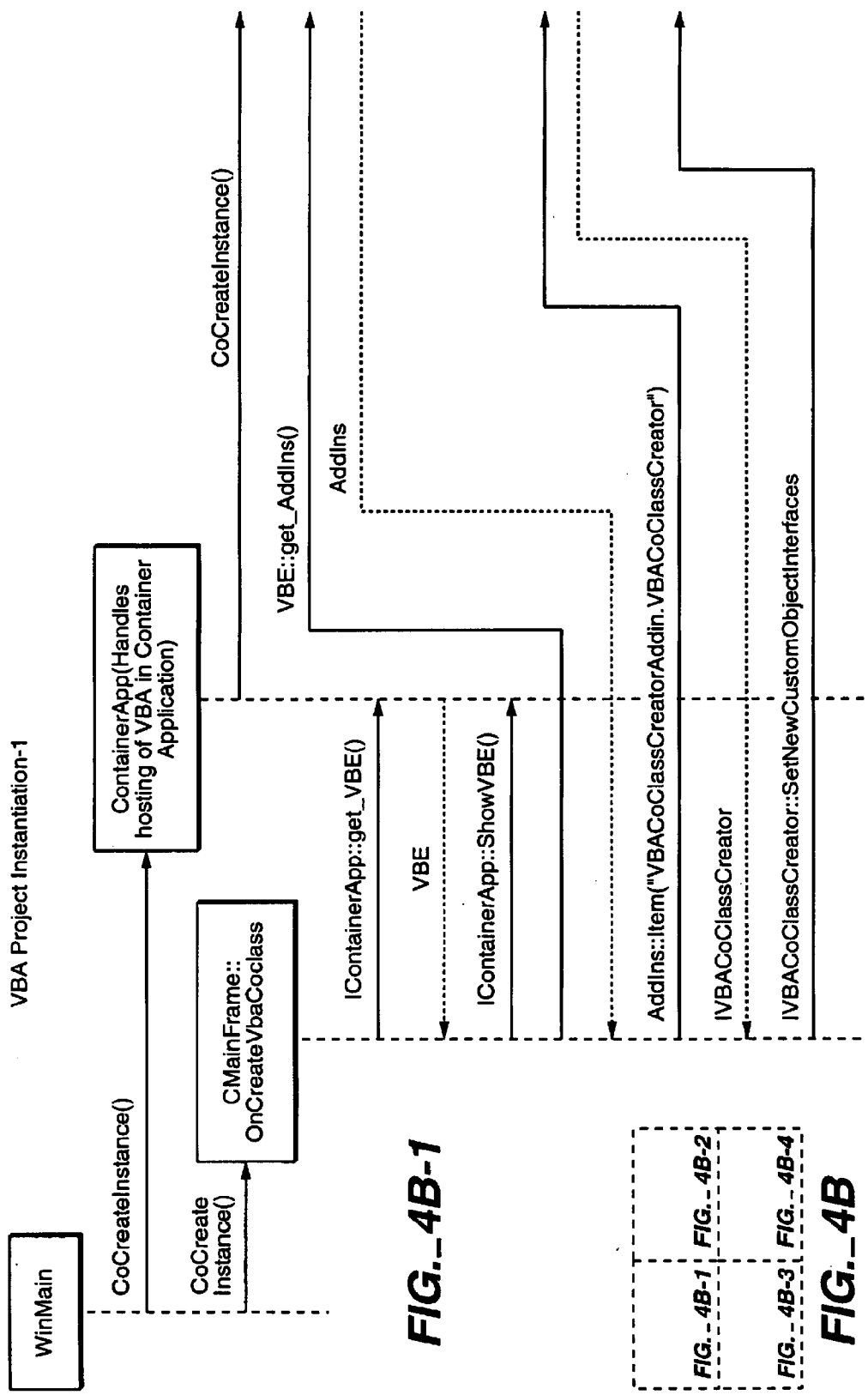

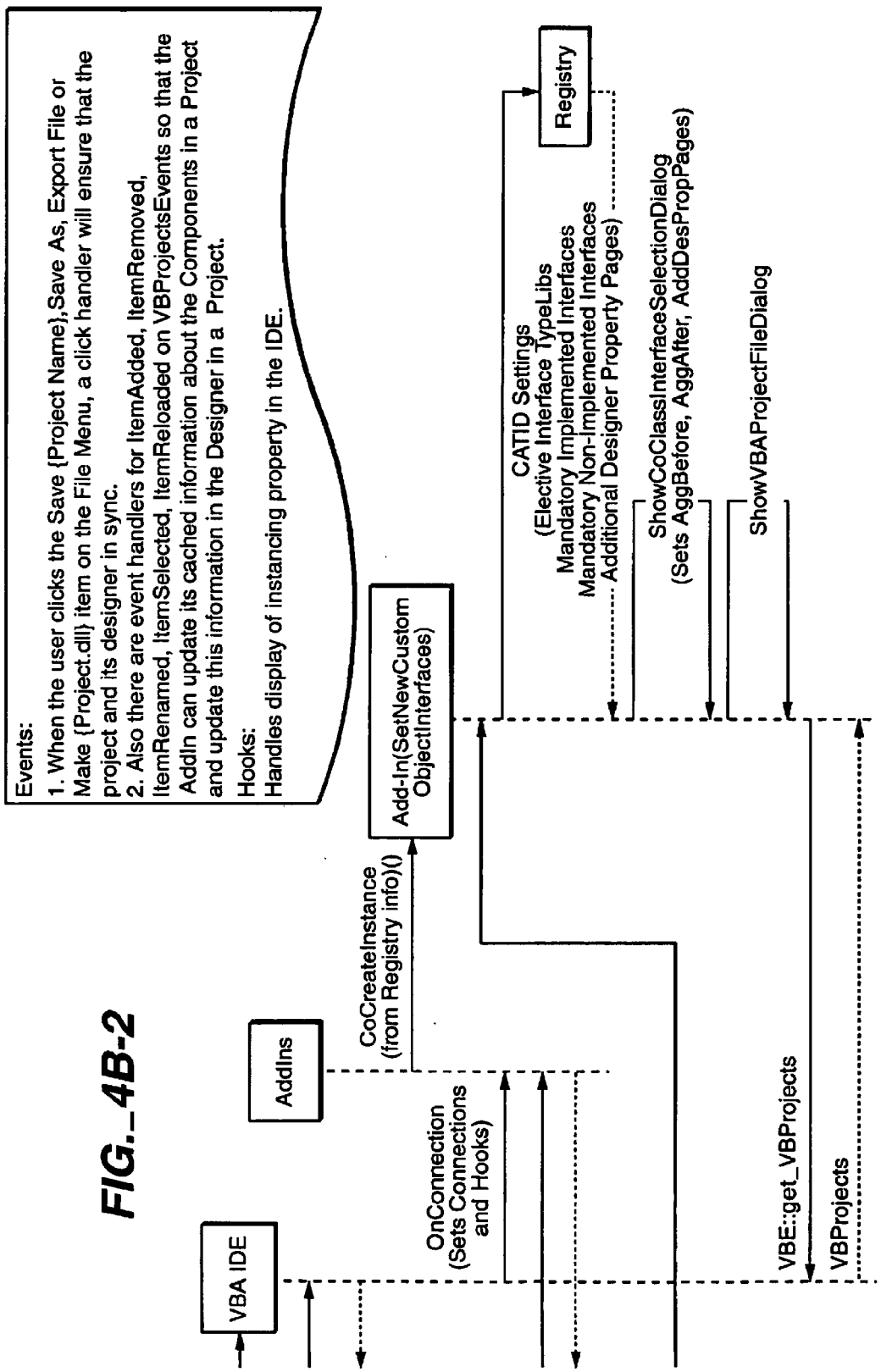

To allow alternate storage such as to a database for now it will be necessary to persist the project file to a disk file first because the MT implementation only allows persistence in a disk file.

*FIG. 4B-3*

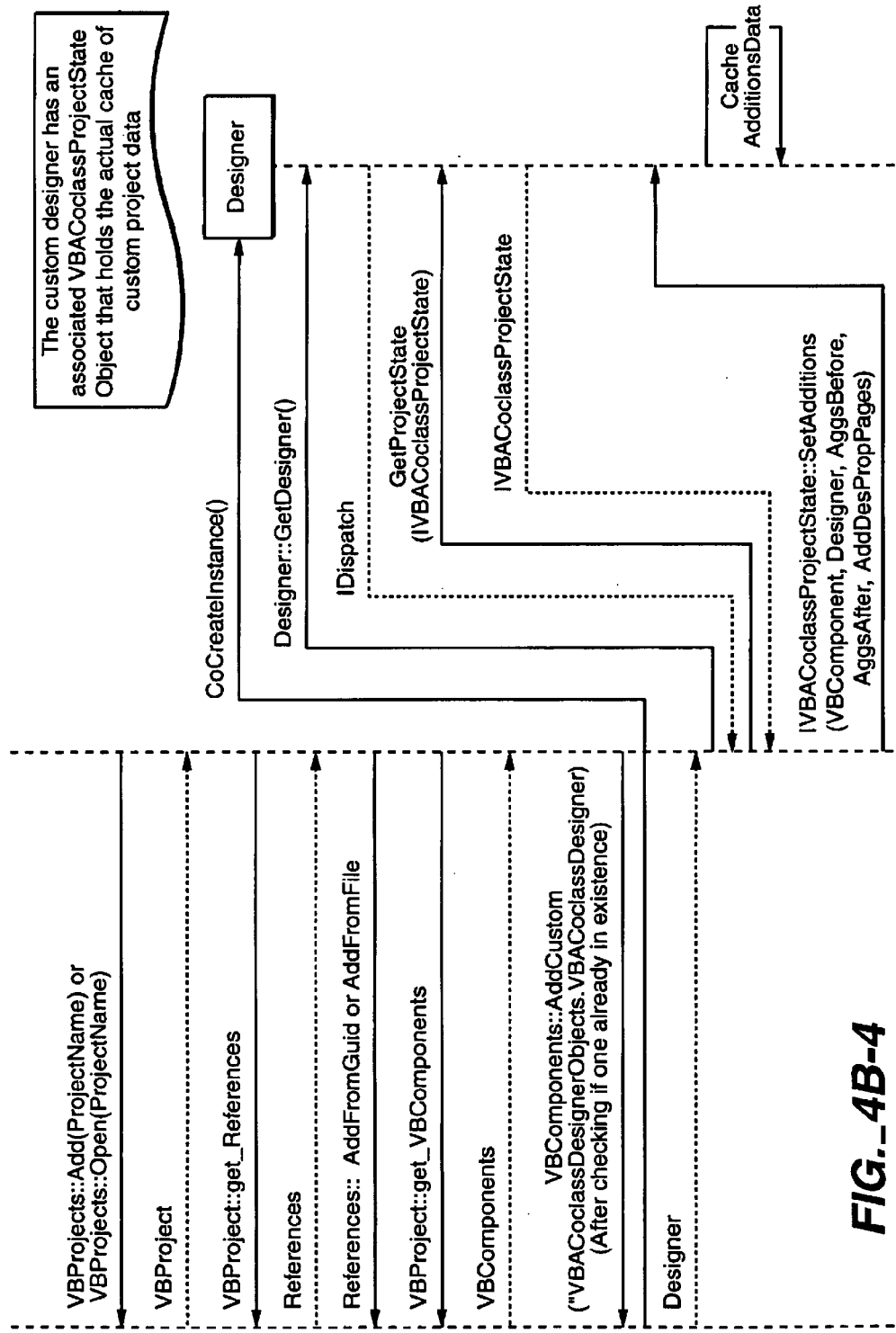
FIG._4B-4

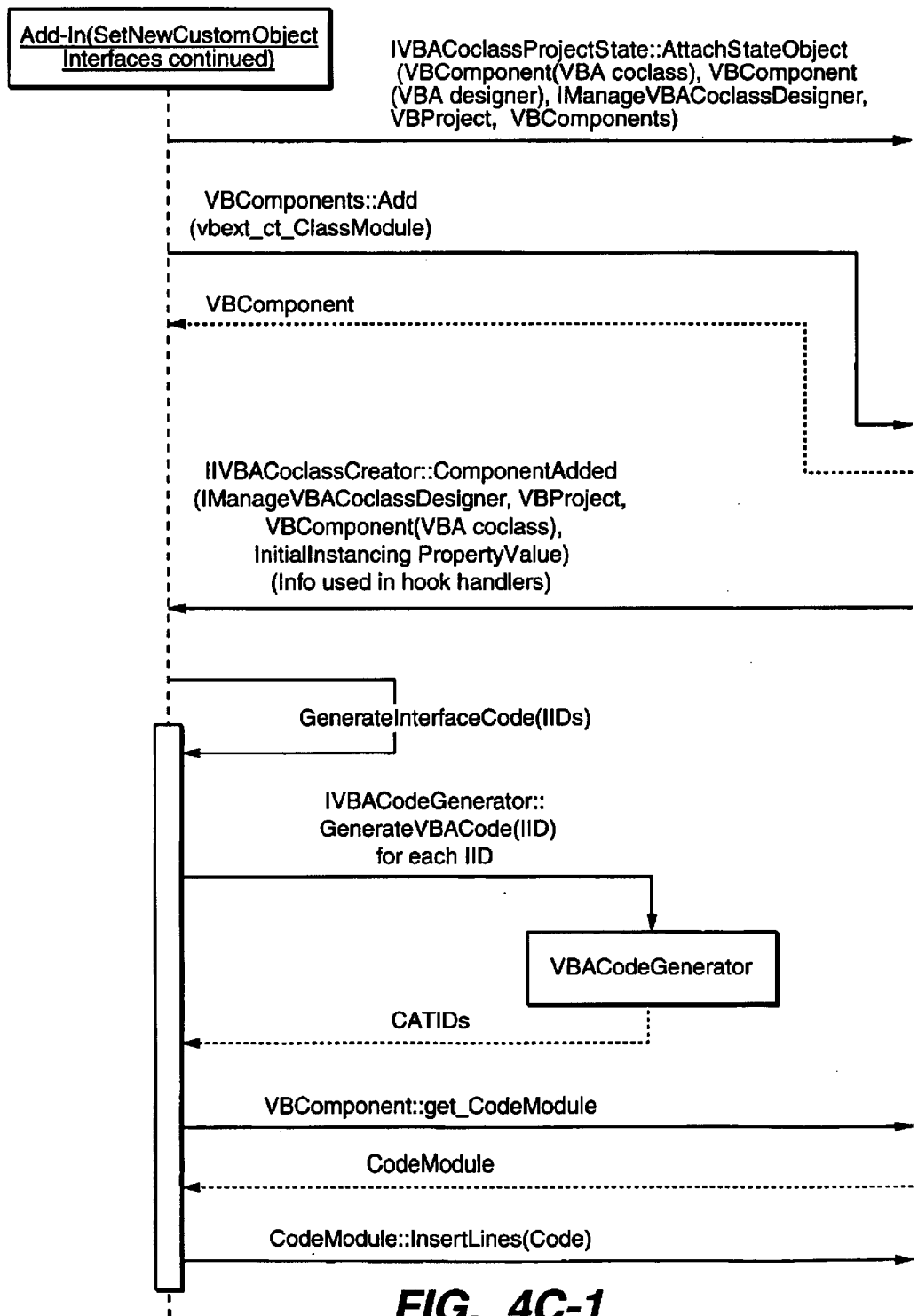
FIG._4C-1

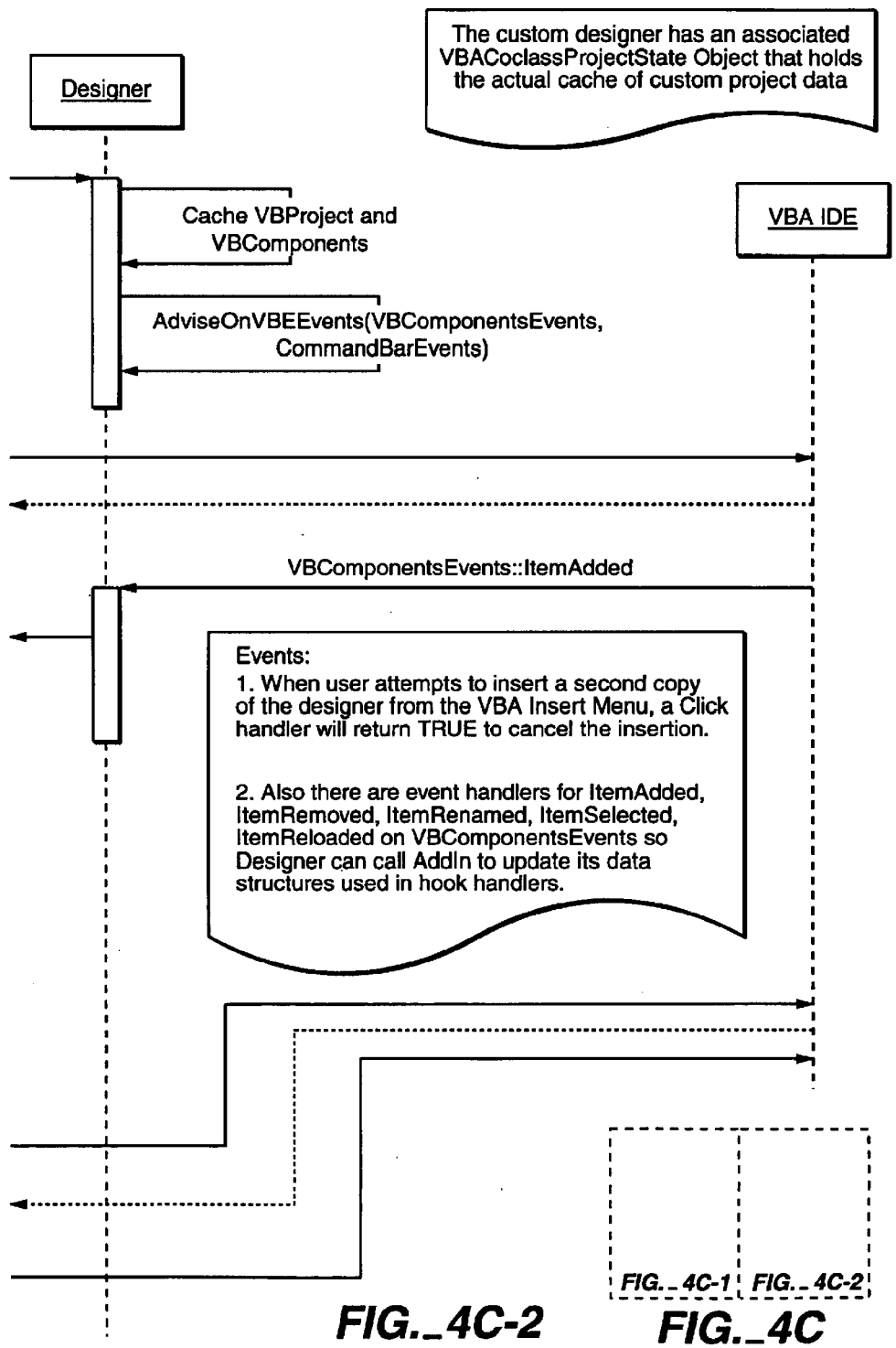

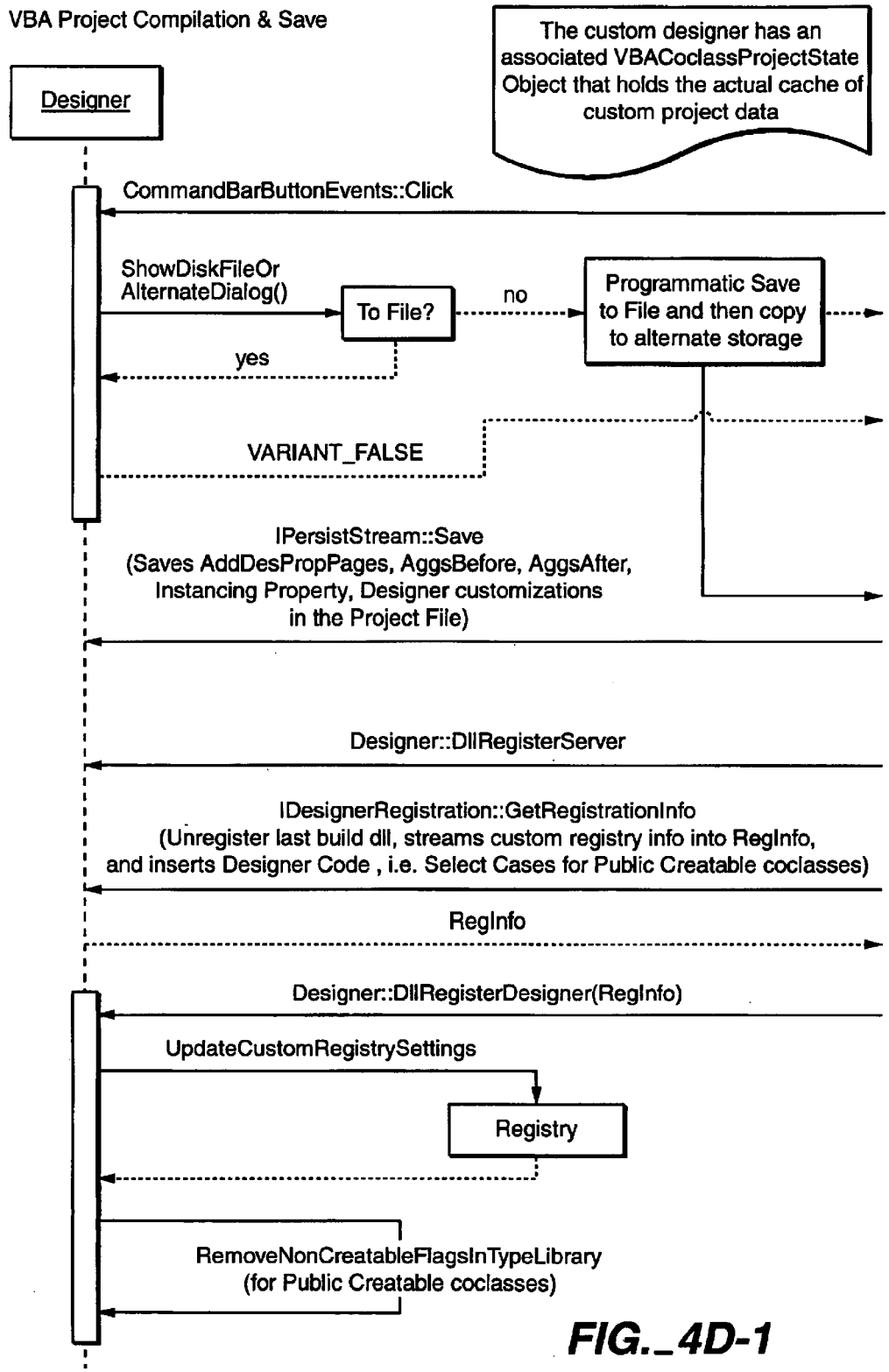
FIG._4D-1

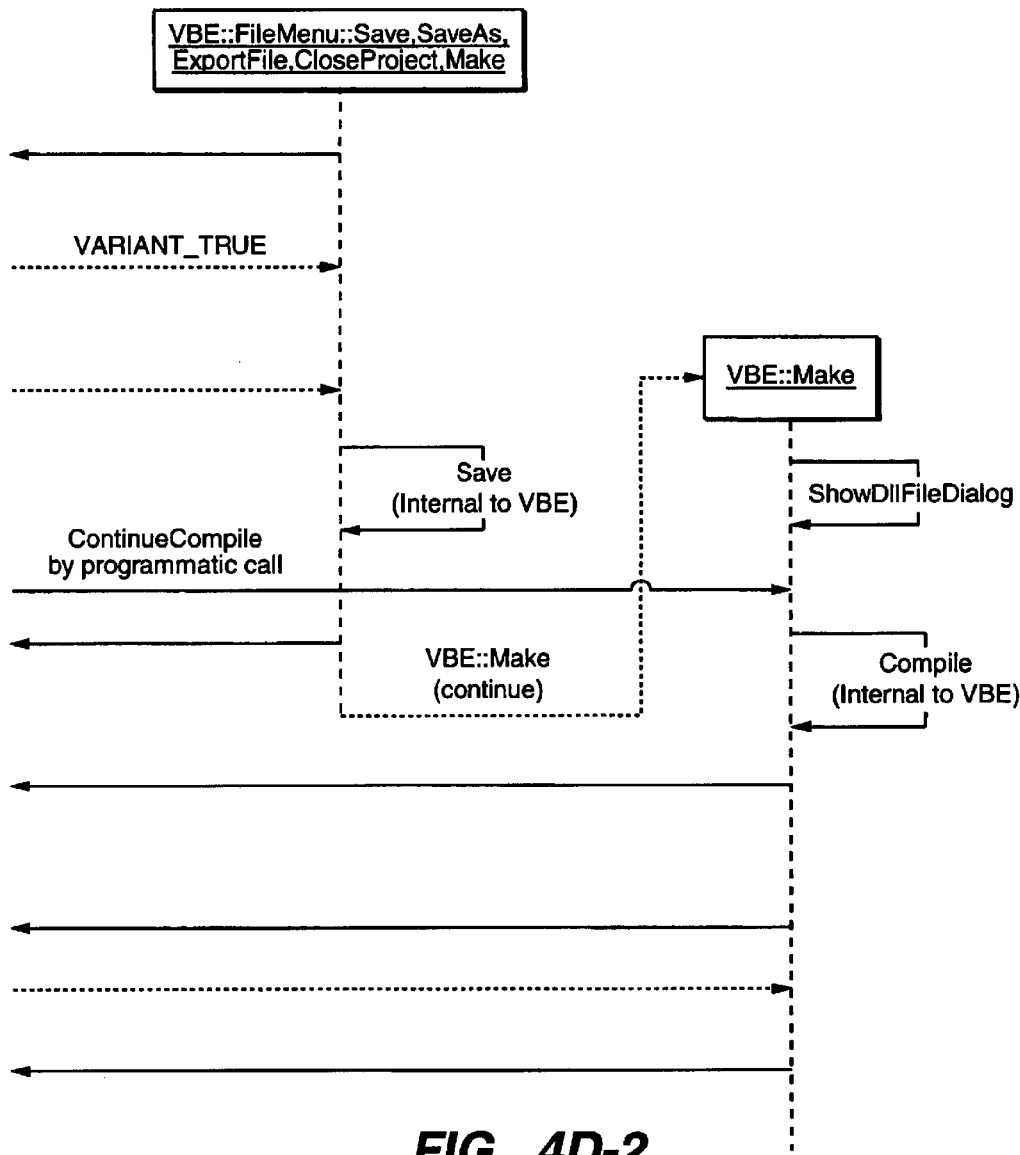
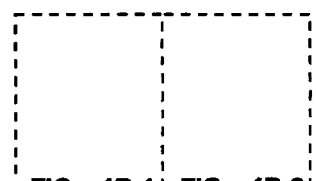
FIG._4D

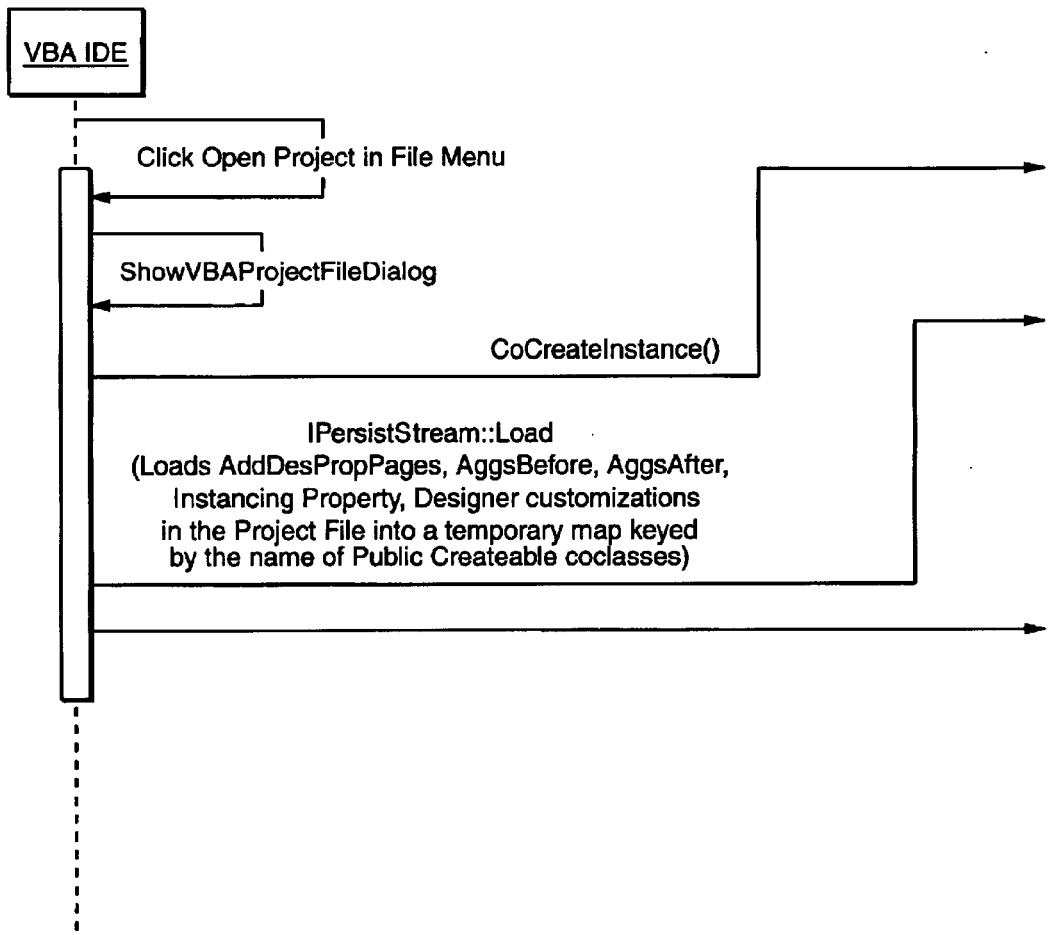
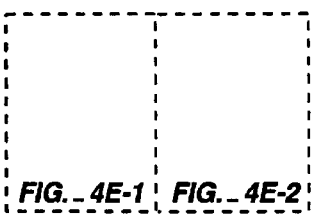
FIG._4E-1
FIG._4E

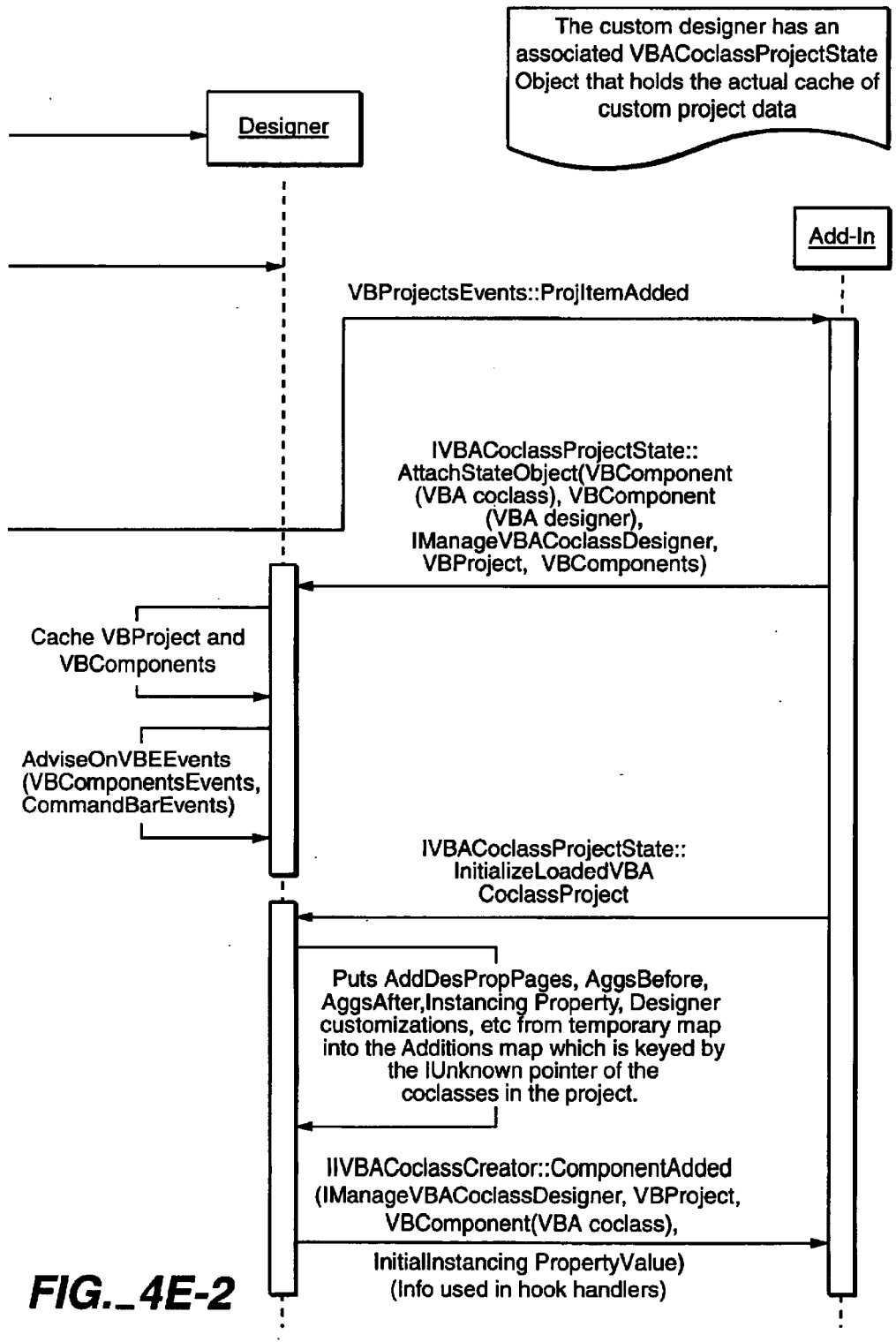
FIG._4E-2

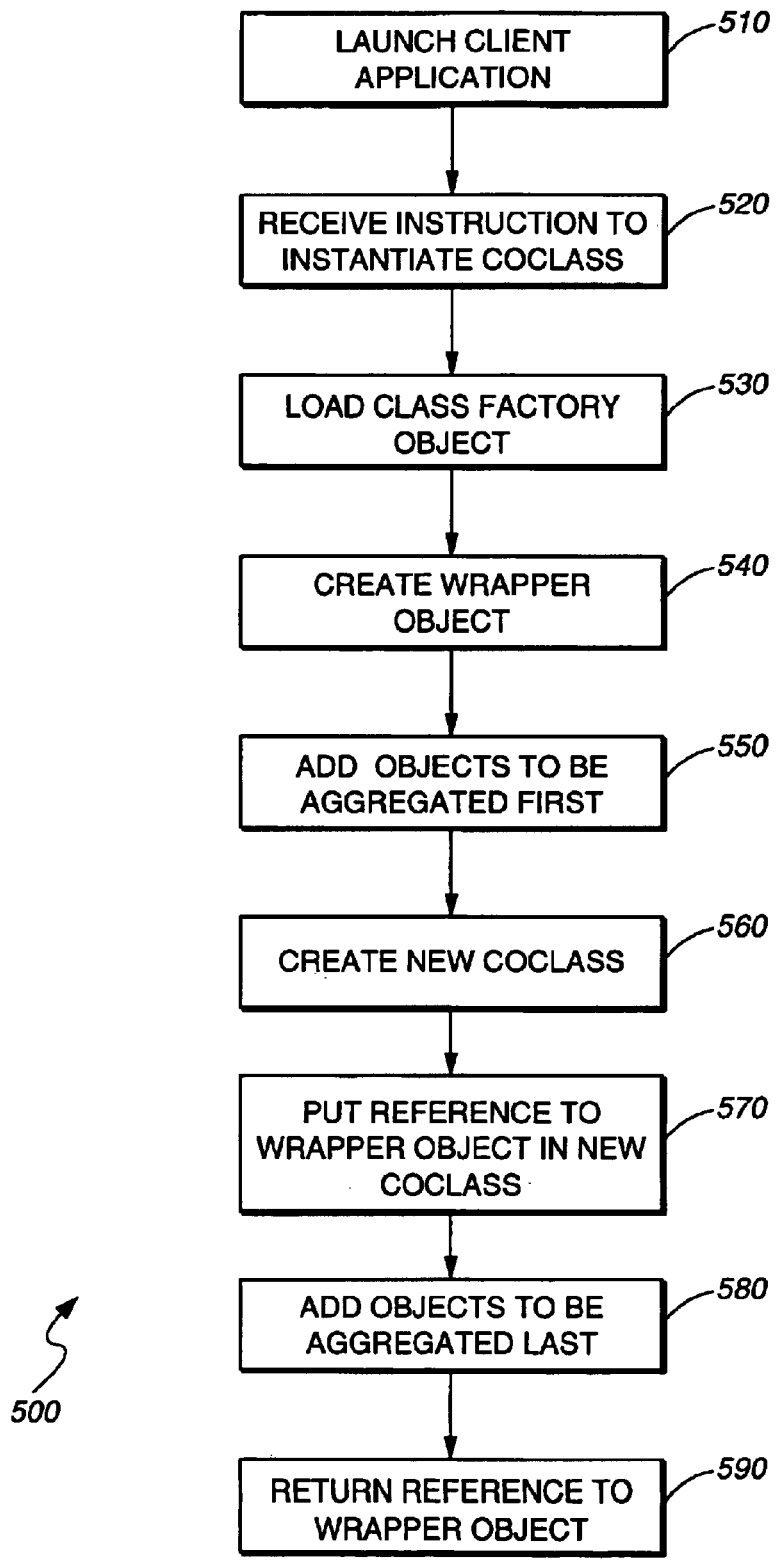
FIG._5

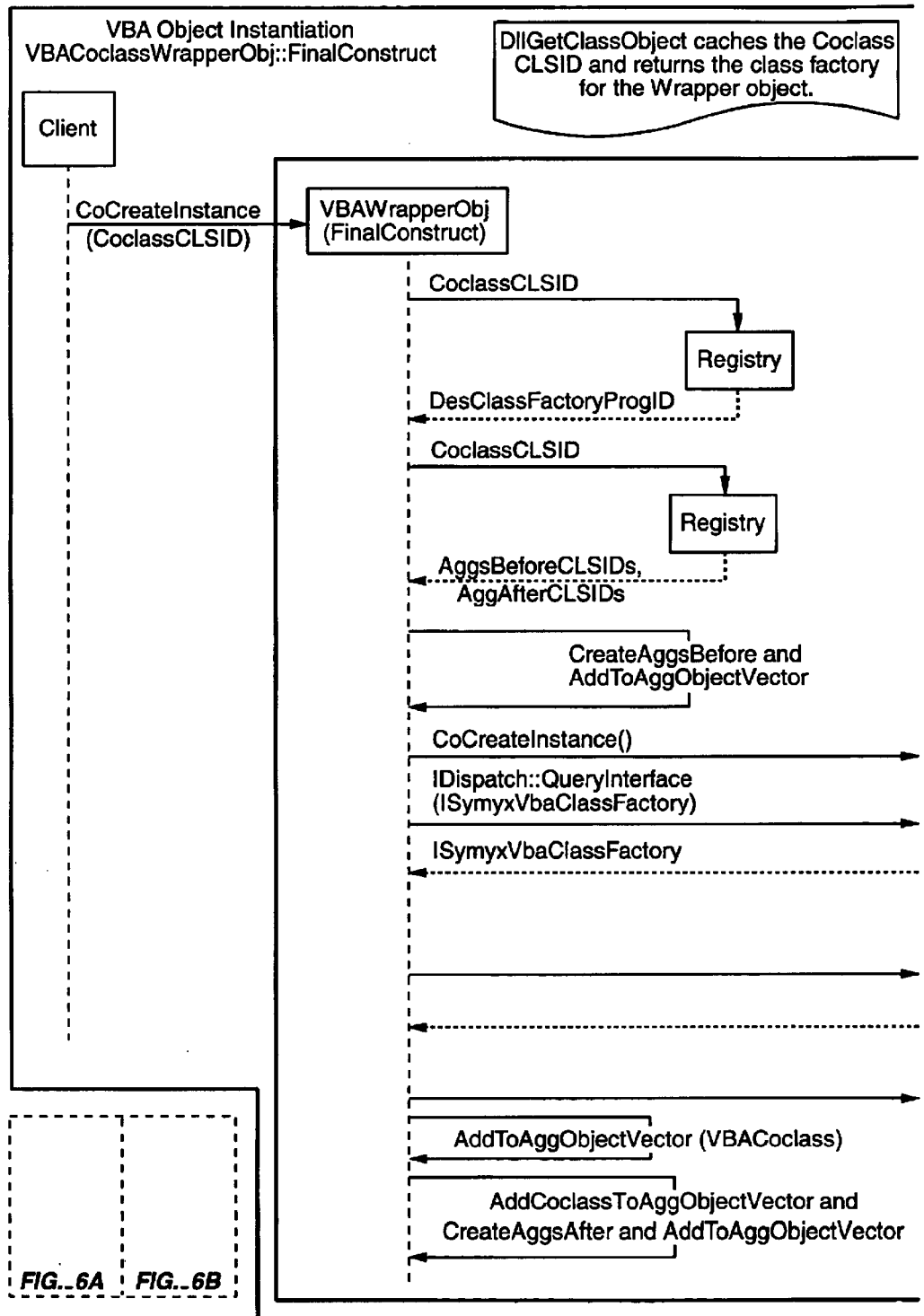
FIG._6
FIG._6A

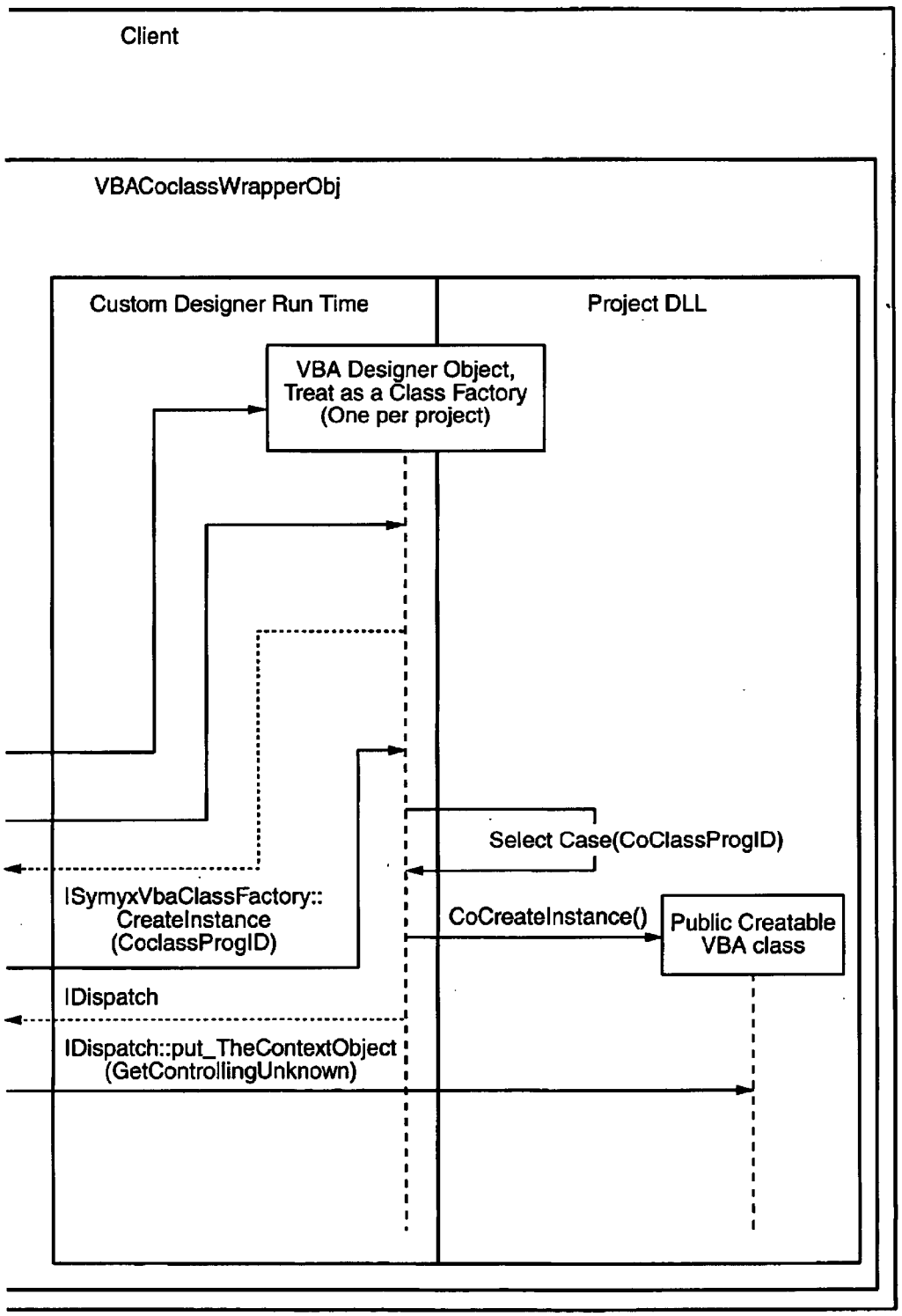
FIG._6B

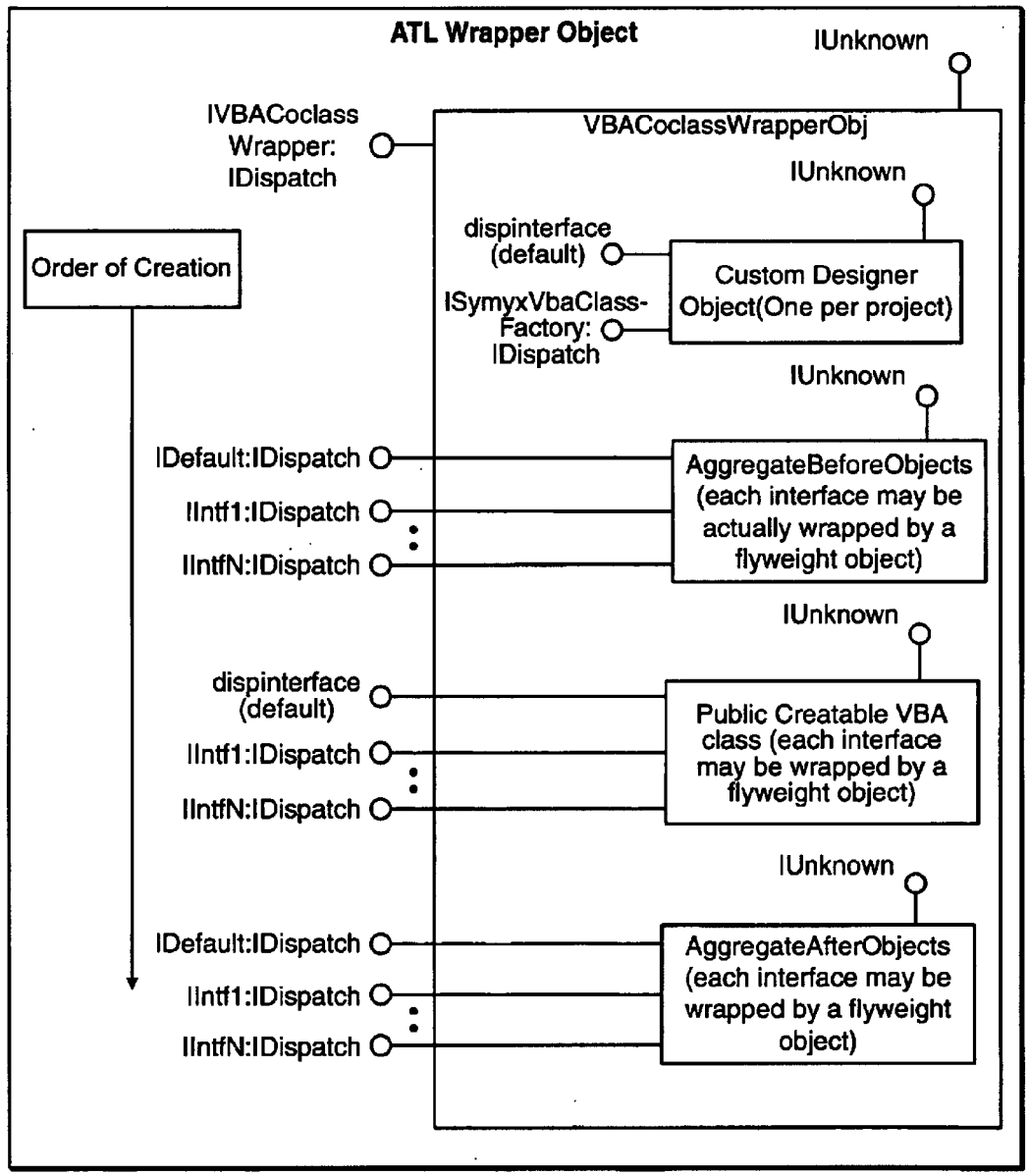
FIG._7

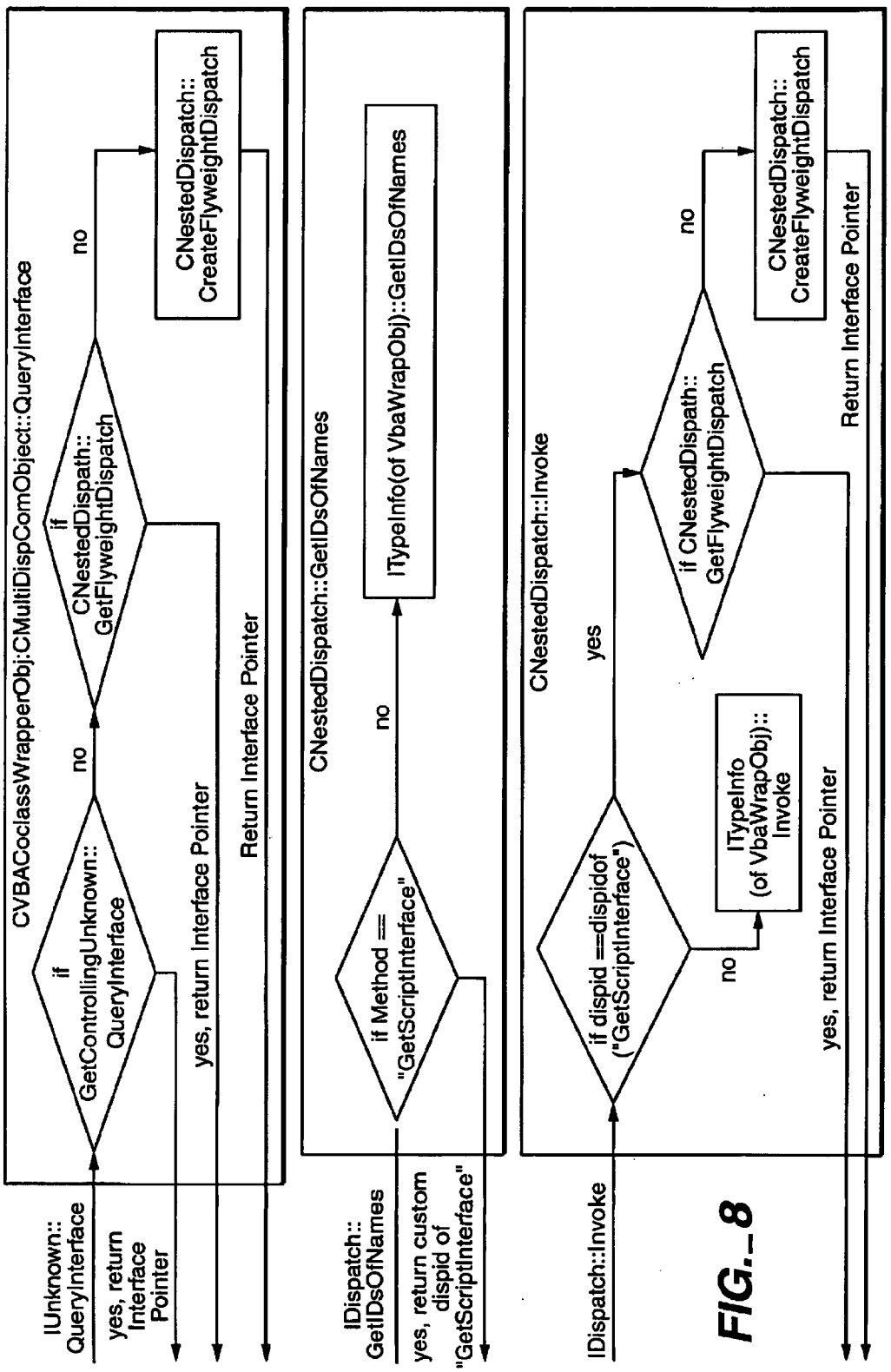
FIG._8

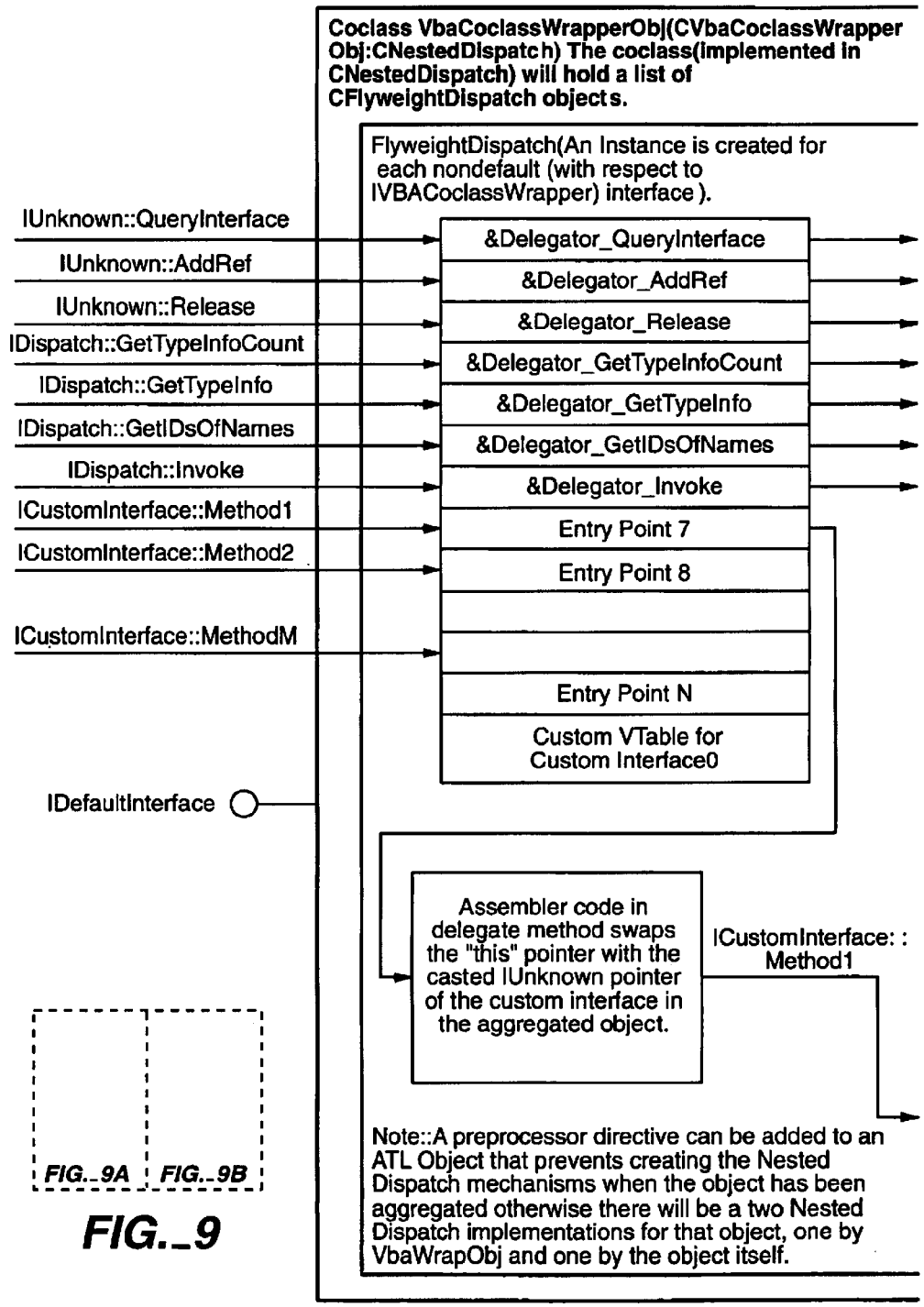
FIG._9A

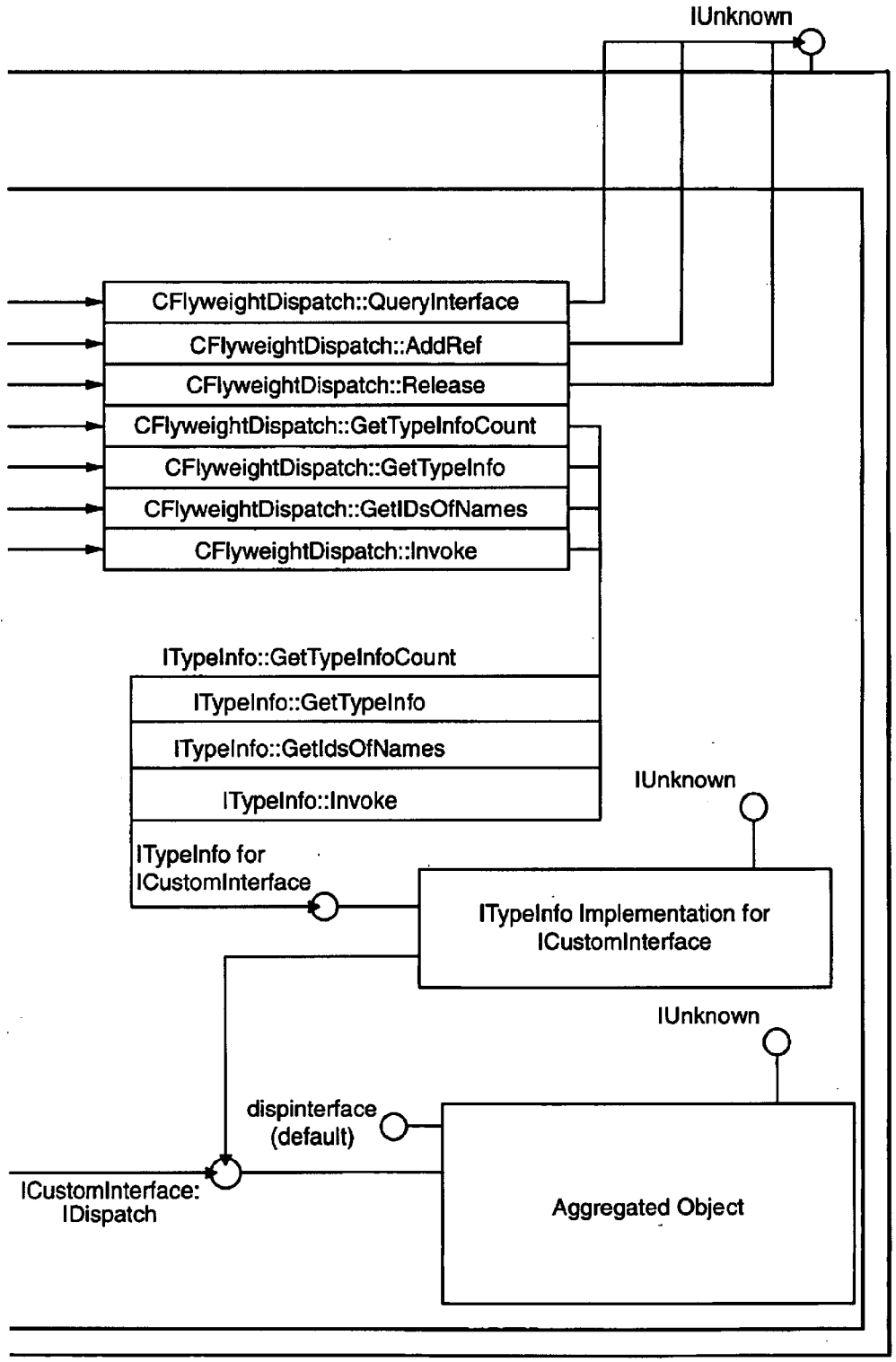
FIG._9B

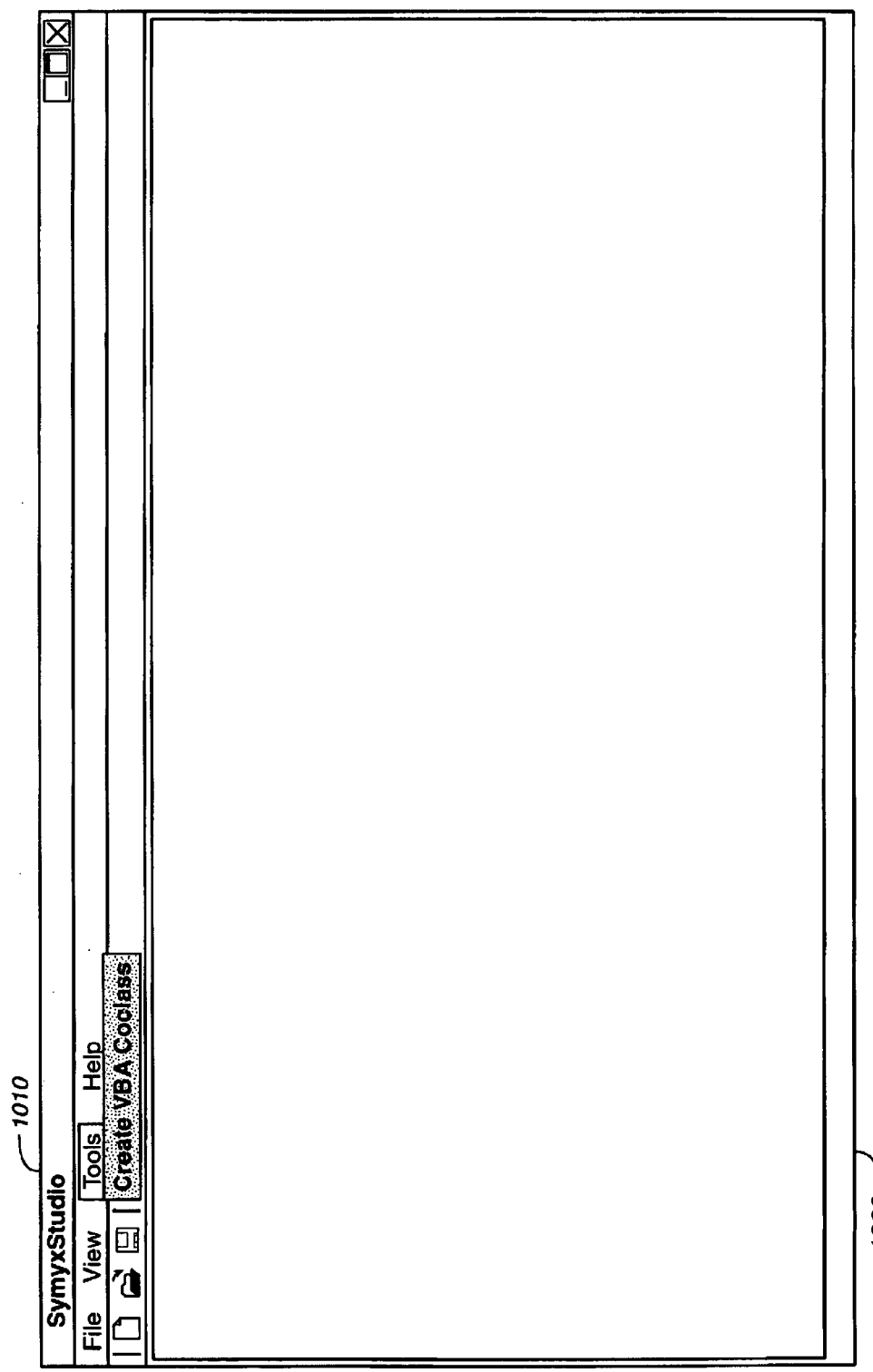
FIG._10A

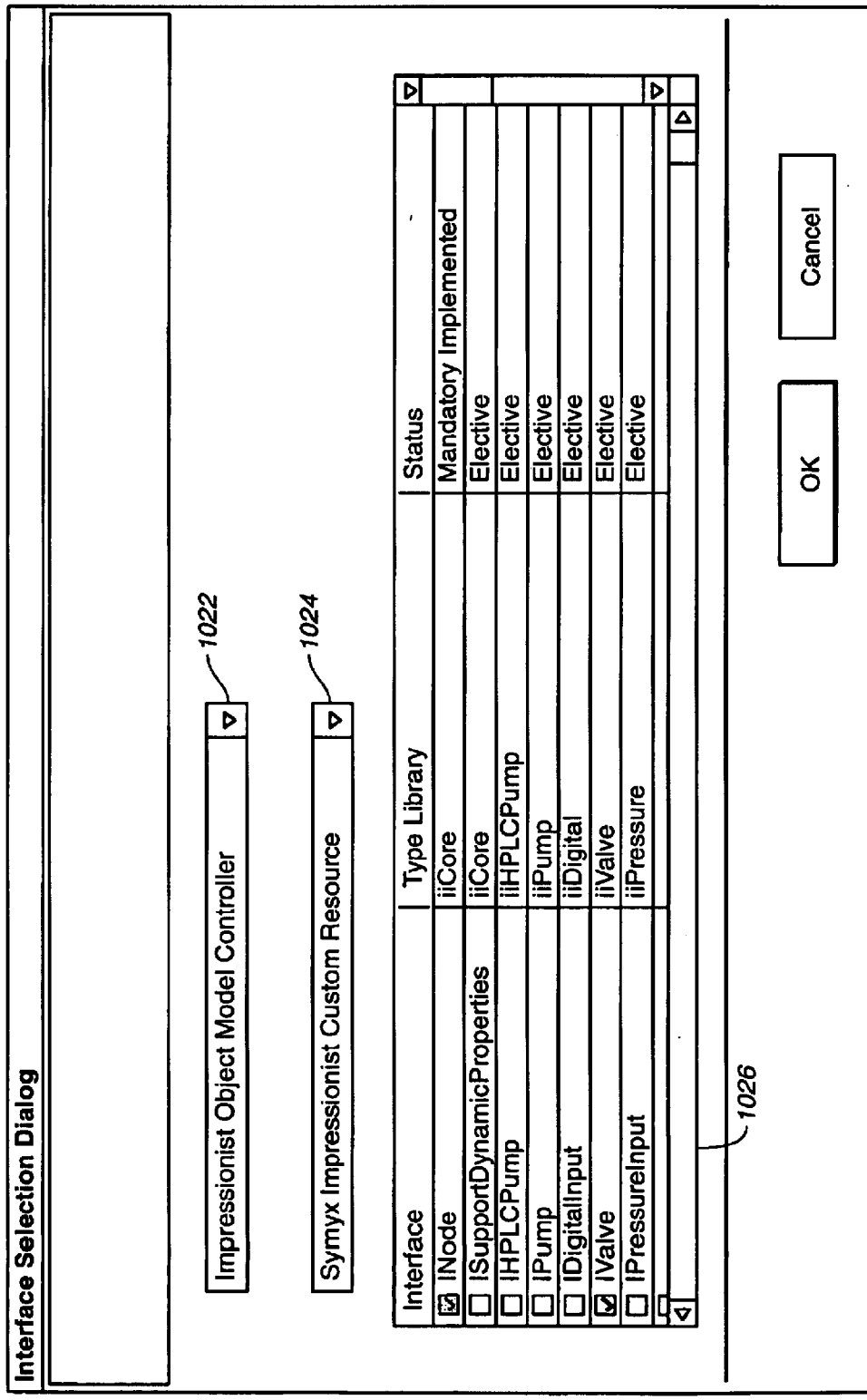
FIG._10B

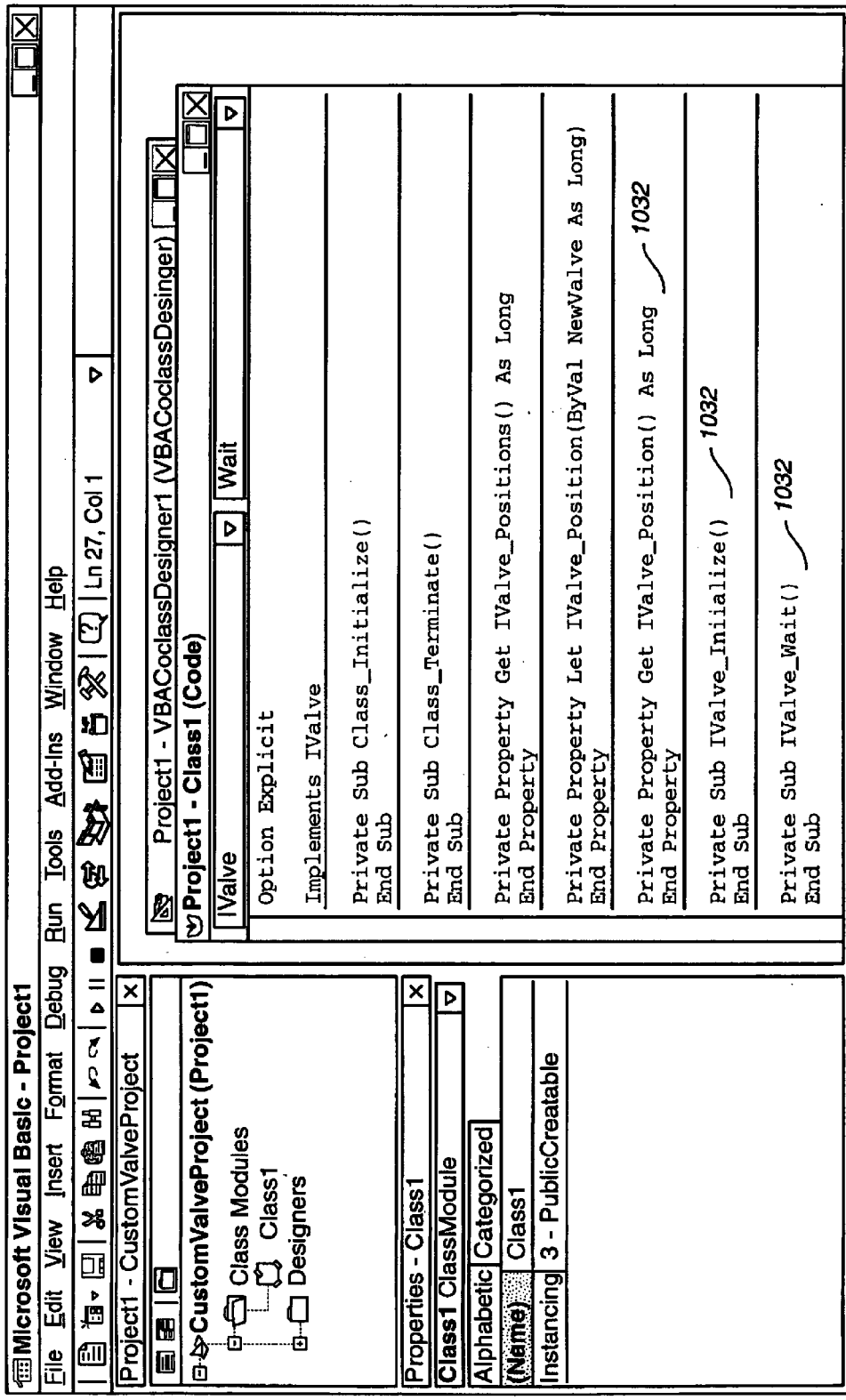
FIG._10C

FIG._10D

Microsoft Visual Basic - F:\VBAIntegrationDemo\CustomValveProject.vba

File  Edit  View  Insert  Format  Debug  Run  Tools  Add-Ins  Window  Help

Project1 - CustomValveProject

CustomValveProject (F:\VBAIntegration Demo\Cus
- Modules
  - TheContextObjectModule
- Class Modules
  - Class1
  - Designers Properties - Class1

Class1 ClassModule

Alphabetic | Categorized
(Name)      Class1
Instancing  3 - PublicCreatable

F:\VBAIntegrationDemo\CustomValveProject.vba - Class1 (Code)

Class ▾ | Initialize ▾

```
Implements IValve

Private m_ValvePosition As Long
Private m_Address As IPropertyInteger
Private m_NumPositions As IPropertySinglecChoice Private Sub Class_Initialize()
    Dim AggNode As INode
    Set AggNode = TheContextObject
    AggNode.Version = 1
    AggNode.IconResID = 0
    AggNode.Name = "Dave's Custom Valve"

Set m_Address = New PropertyInteger
    m_Address.Name = "Address"
    m_Address.XMLTag = "Address"
    m_Address.Value = 1
    AggNode.Properties.Add m_Address Set m_NumPositions = New PropertyEnum
    m_NumPositions.Name = "Number of Positions"
    m_NumPositions.XMLTag = "NumPositions"
    m_NumPositions.Choices = "2|4|8|16"
    m_NumPositions.Text = "2"
    AggNode.Properties.Add m_NumPositions m_ValvePosition = 1

End Sub

Private Property Get IValve_Positions() As Long
    IValve_Positions = CLng(m_NumPositions.Text)
End Property Private Property let IValve_Position(ByVal newValue As Long)
    m_ValvePosition = newValue
End Property Private Property Get IValve_Position() As Long
    IValve_Position = m_ValvePosition
```

1040

Ln 16, Col 1

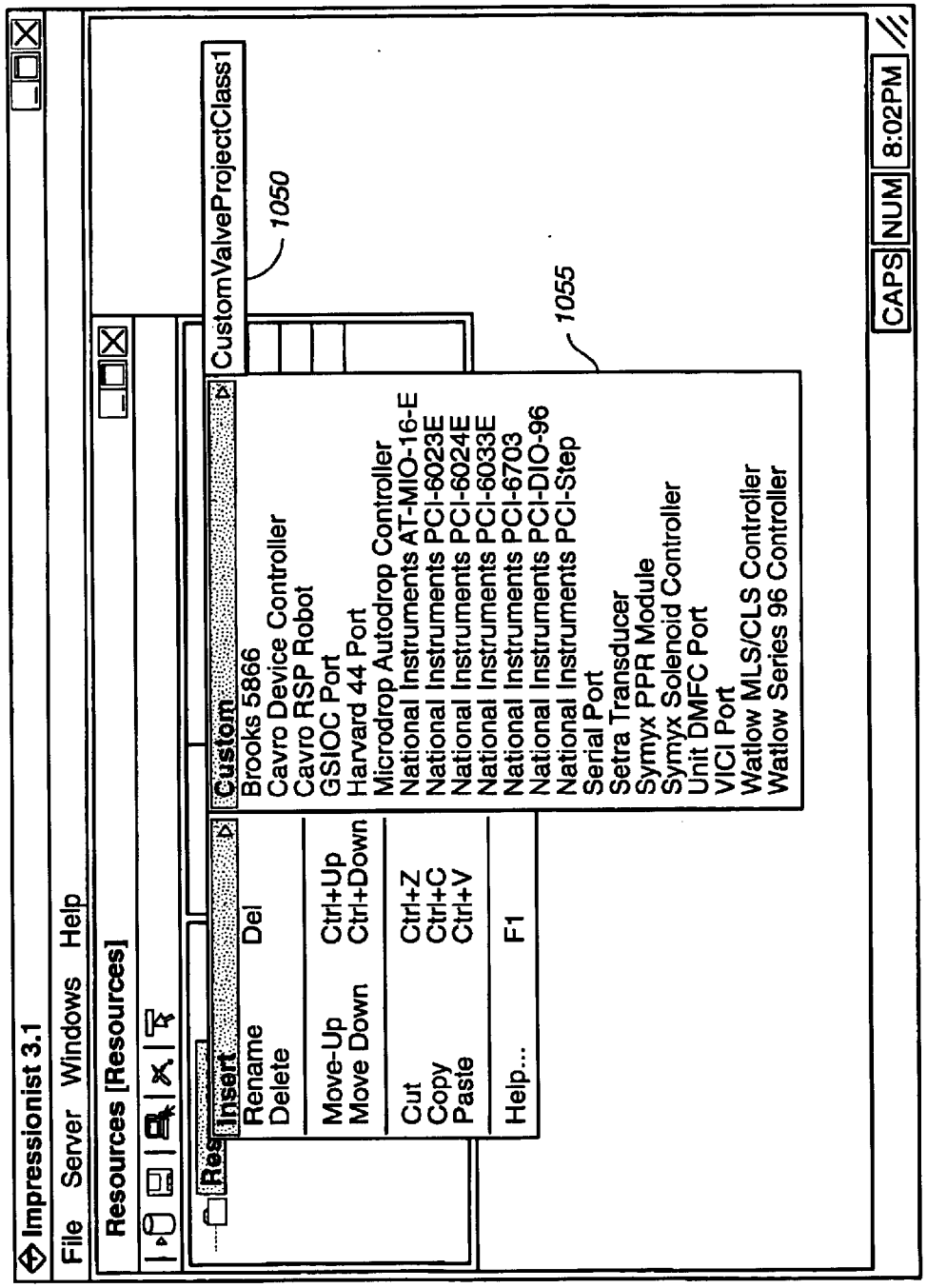
FIG._10E

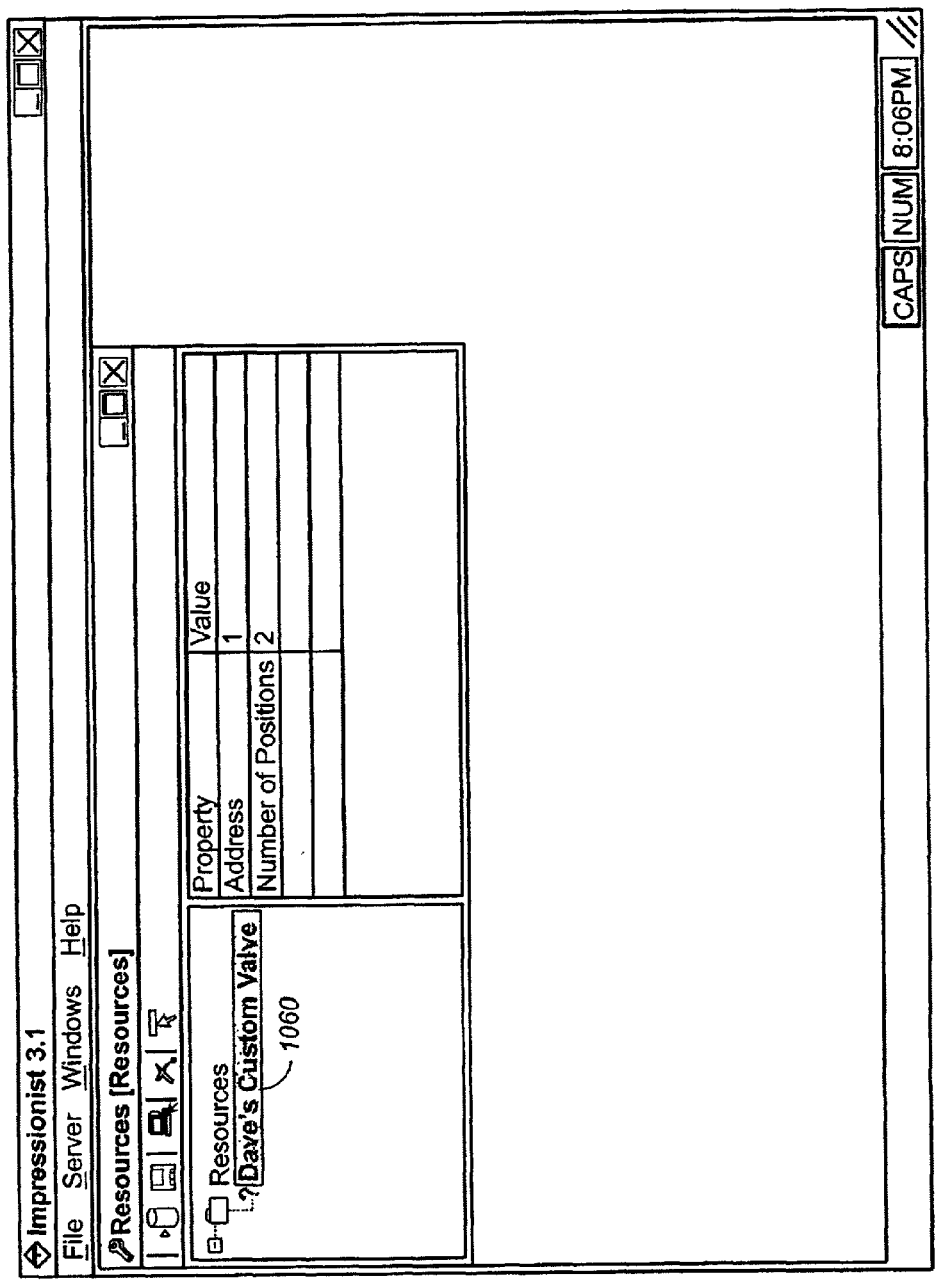
FIG._10F

SYSTEM AND METHODS FOR INTEGRATION OF CUSTOM CLASSES INTO PRE-EXISTING OBJECTS MODELS

TECHNICAL FIELD

This invention relates to the field of graphical computer programming environments.

BACKGROUND

In traditional object-oriented programming environments, the incorporation of new functionality into an existing object model involved the hand generation of extensive quantities of software code specifically defining the implementation of the new functionality—e.g., one or more additional object classes encapsulating the desired functionality—and integrating that implementation into the existing object model. To do so typically required the application developer to assess user needs, evaluate the impact of any proposed change on hardware and software system components and implement changes at the source code level, using object-oriented programming languages such as C++. This process placed the extension of an existing object model squarely in the hands of the application developer, requiring a level of programming knowledge beyond the reach of many application users.

More recently, the introduction of integrated development environments that are directly embedded into a software application such as Microsoft's Visual Basic® for Applications (VBA) has simplified the process of application customization and extension for the end user. VBA includes both host and standalone project types that an end user can create. Host projects allow the end user to extend the object model of an application, but the extensions are limited to objects that are tightly coupled to the GUI instance of the application and the VBA IDE. As a result, such objects cannot be publicly created separate from the specific application instance. Also the mechanisms involved do not provide for easily adding new templated classes to the object model for extension by the end user and do not assist the user in integrating new instances into an instance of an existing object model.

VBA 6.x,, available from Microsoft Corporation, includes a multithreading capability (VBAMT) that allows the developer to create multithreaded projects, i.e., projects containing multiple threads that can execute concurrently. These projects are "standalone" in that the code that executes is not tightly coupled to the GUI instance of the application that hosts the VBA IDE. The process begins with a host application that registers one or more multithreading ("MT") project types. Using these registered project types and an ActiveX VBA MT Designer, users of the application can create multithreaded projects, which are compiled and published as stand-alone DLLs.

A published MT project DLL can be used by other multithreaded host applications. To do so, a thread creates an instance of a VBA MT runtime object and an instance of a global application object associated with the MT project, against which the MT project executes code. The VBA MT runtime object is initialized through the IVbaMT interface, which loads all registered MT project DLLs. The collection of loaded MT project DLLs can be accessed through the IVbaMTDlls interface. Any number of threads can use an MT project DLL concurrently.

When a new MT project is created, a design instance of the MT Designer is created and associated with a logical group of threads. The user can then add classes, forms, and modules to the project. However, VBA MT provides that these classes are not publicly creatable outside of the VBA environment. Nor are these classes instances of the templated objects of an object model. The VBAMT capability provides no mechanisms to assist the end user with integrating a VBAMT project object into an enterprise wide application with a minimum of knowledge by the end user of the specifics of how to integrate into the enterprise environment.

VBA does allow the public creation of an ActiveX designer instance from a standalone project, but ActiveX designers require high-level programming skill and still do not provide the convenient object model integration support that a typical end user would require.

SUMMARY

The invention provides methods, systems, and computer program products that provide the benefits of an application-embedded integrated development environment in designing object classes, but that allow users to instantiate and use objects of those classes outside of the development environment.

In general, in one aspect, the invention features methods, systems and computer programs implementing programming techniques for generating custom object classes. The techniques include providing a runtime environment including a client application implementing an object model, receiving in the client application a first user input including a custom class creation request specifying a class type for a custom class, in response to the first user input, launching a design-time environment for defining custom object classes, retrieving class functionality information for a class template associated with the specified class type, receiving in the design-time environment a second user input specifying a subset of the elective class functionality to be implemented in the custom class, and generating in the design-time environment a class definition defining a custom class having the required class functionality and the specified elective class functionality. The object model includes a hierarchy of object classes capable of being instantiated in the client application. The object model also includes one or more class templates. Each class template has an associated class type and includes class functionality information for a custom class that can be implemented in the client application. The class functionality information for each class template includes a set of required class functionality for the class type and a set of elective class functionality for the class type. Objects belonging to the custom class can be instantiated from the runtime environment independent of the design-time environment.

Particular implementations of the invention can include one or more of the following features. The class functionality information can include information identifying a set of mandatory interfaces defining the required class functionality for the associated class type and information identifying a set of elective interfaces defining the elective class functionality for the associated class type. After the class functionality information for the class template is retrieved, a list of the set of elective interfaces defining the elective class functionality can be displayed to the user. The second user input can include a user selection of one or more of the elective interfaces from the displayed list of elective interfaces. Generating the class definition can include aggregating a plurality of objects implementing the mandatory interfaces and the selected elective interfaces. Each of the elective interfaces can have a set of associated interface properties and interface methods, and a third user input can be received in the design-time environment including one or more code fragments further defining one or more of the interface properties and/or interface methods associated with at least one of the selected elective interfaces. Code skeletons can be generated for one or more of the interface properties and interface methods associated with the selected elective interfaces based on object metadata describing the specified elective interface that is associated with the interface property or interface method. Code skeletons can be displayed to the user. The design-time environment can include a graphical user interface. The runtime environment can be independent of the graphical user interface. An object of the custom class can be instantiated in the runtime environment. The class definition can be generated as a dynamic linked library. Instantiating the object can include calling the dynamic linked library in the runtime environment. The runtime environment can include a wrapper object operable to execute code in the dynamic linked library. The client application can be an automated process control program and the custom class can be a resource class for defining an apparatus driver for an apparatus coupled to the automated process control program. The client application can be an automated process control program and the custom class can be an action class for defining an action capable of being implemented by the automated process control program.

Advantages that can be seen in particular implementations of the invention include one or more of the following. The user can create and implement custom component object classes in a graphical design environment, while resulting instances of the custom class are decoupled from the graphical design environment. The custom class instances can be integrated into a larger object hierarchy that is separate from the graphical design environment. Decoupling the object model and services from a particular graphical design environment provides greater scalability, reuse, extensibility, and transactional isolation. In this conceptualization, a particular graphical user interface or application is just a "view" or "port" into the particular object model.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a block diagram of a system for designing and instantiating custom component object classes.

FIG. 2 is a block diagram illustrating the components of a client application providing design-time and runtime environments for designing and instantiating custom component object classes.

FIG. 3 is a flow diagram illustrating a method for designing a custom component object class.

FIG. 4A is a flow diagram illustrating one implementation of a custom class creation method.

FIGS. 4B–C are sequence diagrams illustrating the method of FIG. 4A in more detail.

FIG. 4D is a sequence diagram illustrating one implementation of a custom project compilation and save sequence.

FIG. 4E is a sequence diagram illustrating one implementation of a custom project open sequence.

FIG. 5 is a flow diagram illustrating an object instantiation method for a custom class.

FIG. 6 is a sequence diagram illustrating one implementation of a custom object instantiation sequence.

FIG. 7 is a block diagram showing the layout of the internal objects in a context wrapper object.

FIGS. 8 and 9 are flow diagrams illustrating methods for implementing multiple dual interfaces.

FIGS. 10A–F illustrate a user interface for a custom class design and object instantiation system in the context of an automated process control system.

Like reference symbols in the various drawings indicate like elements.

DETAILED DESCRIPTION

The invention provides a computer-implemented process and computer program products for an end user to define component object classes (or "coclasses") in a host graphical design environment and to instantiate those classes as objects suitable for merging into an existing object model that is separate from the graphical design environment (e.g., an object hierarchy implemented in a computer program application running in a process separate from the host design environment). As used in this specification, a "coclass" is a component class description that specifies the definition of that class—that is, the functionality that members of the class must possess—typically by specifying the interfaces that class members (instances) must implement. A component class is a class that can be instantiated by programming language independent means. Coclasses are generally implemented in DLLs or in executable files, each of which can contain one or more coclasses. As used in this specification, an "object" is a particular instance of a coclass. An object's functionality is defined by the interfaces specified for the corresponding coclass, which define the set of methods that control the object's operation. Although the disclosed implementation describes the integration into an existing object model of coclasses defined in the Visual Basic for Applications integrated development environment ("VBA IDE") (available from Microsoft Corporation of Redmond, Wash. and Summit Software of Jonesville, N.Y.) the invention is equally applicable to other well-known programming environments, such as, e.g., a Java Virtual Machine or a variety of scripting languages.

FIG. 1 illustrates a system 100 that includes a general-purpose programmable digital computer system 110 of conventional construction, including one or more processors running a coclass design module 120 and an object instantiation module 130. Coclass design module 120 and object instantiation module 130 can be hosted within a single graphical client application 135. Alternatively, or in addition, object instantiation modules 130 can be hosted in one or more client applications 137 separate from coclass design module 120 (which client applications can be running on computer system 110 or on one or more other computer systems). Computer system 110 is coupled to a memory 140, which stores object model information 150 relating to a pre-existing object model implemented by an object model controller 155, which may have one or more subcomponents. Object model information 150 includes object model metadata, such as data relating to templated objects (type information) and objects that can be instantiated based on the template data (object repositories). In a typical Microsoft Windows environment, type information may be contained in one or more type libraries 145 stored in memory 140, and may include information describing one or more interfaces that can be implemented in coclasses designed in coclass design module 120 and/or instantiated in object instantiation module 130. The registry 152 stores user-, application-, and platform-specific registry information, including information defining the coclasses that can be implemented from a particular application and/or interfaces implemented for a particular coclass, and may serve as the object repository, such that entries for an object in the registry will indicate a memory location where the object binary is stored. System 100 also includes input/output devices 160 (such as a keyboard, mouse, display or other conventional input/output devices) and, optionally, conventional communications hardware and software by which computer system 110 can be connected to other computer systems, by a computer network such as a local area network, wide area network or the Internet. Although FIG. 1 illustrates computer system 110 as a single computer and memory 140 as a single memory, the functions of computer system 110 and memory 140 can be distributed among multiple computer systems and memories in a network.

Referring to FIG. 2, coclass design module 120 provides a design-time environment 200 including a container application 210 hosting an integrated development environment. Container application 210 includes an instance of a custom Add-In 220. As used in this specification, an Add-In is a software component that is placed into a software application (and its embedded IDE) to configure that application in a predefined (or particular) way. Add-In 220 includes a code generator object 225. Additionally, container application 210 can contain multiple software projects 230 in which new coclasses are defined, each of which contains an instance of a custom designer 235. As used in this specification, a designer is a software component that can be placed into a software project to configure that project in a predefined (or particular) way. Each project also includes the coclass design time code 240 for a new coclass. Object instantiation module 130 provides a runtime environment 250 that includes context wrapper objects 260, which provide an interception layer that executes code in a project 270, and include an instance of a system multithread runtime object 280 and an instance of the custom designer runtime 290 that is compatible with system multithread runtime object 280.

FIG. 3 illustrates a method 300 for creating a new component object class. The method begins when a user starts a client application 135 (or 137) implementing a pre-defined object model (step 310). The user provides an input specifying the creation of a new coclass implementation (including information identifying a particular type of coclass to be created) (step 320), for example, by selecting one or more appropriate menu items or tool bar buttons in a graphical user interface of the client application. Client application 135 launches coclass design module 120 (or, in the case of client applications 137, causes computer system 110 to do so), which receives information defining an object model implemented in client application 135 (step 330). Coclass design module 120 retrieves a list of interfaces associated with the class type from registry 152, as well as context information necessary to tie objects instantiated from the new coclass into the client application's object model (step 340).

Coclass design module 120 displays the list of interfaces to the user on output device 160 and the user selects one or more interfaces to be implemented in the coclass (step 350). Coclass design module 120 creates a new project and a coclass (step 360). For each selected interface, coclass design module 120 locates a type library 145 containing property and method definitions for each property and method associated with the interface, and a code skeleton for each such property and method, which are displayed to the user (step 370). The user can then enter additional code implementing the properties and methods (step 380), and completes the process by compiling and registering the project containing the coclass (step 390). The coclass is then available for use in runtime environment 125, as will be described in more detail below.

In one implementation, the integrated development environment is implemented in the Visual Basic for Applications IDE, and includes Add-In 220 and a design-time instance of custom designer 235, both of which are compatible with the VBA IDE. In this implementation, projects 270 are generated in runtime environment 250 as VBA project dlls. In multithreaded VBA, there can only be one instance of a designer class in the dll per thread, and only designer runtime instances are directly externally creatable. Accordingly, system 100 uses the designer object in runtime environment 250 as a class factory for classes that would otherwise not be publicly creatable (e.g., classes normally flagged as PublicNotCreatable). Each project includes one of these designer objects. The designer used for VBA class object instantiation implements a class factory interface that creates an instance of the implementation of a templated VBA coclass. Also the designer provides for custom registration of the implementation of a templated VBA coclass. Other designers can be used in the VBA project for other purposes such as to design a database connection or a form.

FIGS. 4A–E illustrate in more detail one implementation of a custom class creation sequence implementing a custom class as a project dll in Visual Basic for Applications for an object model controller having the registry settings set out in Table 1. In this implementation, the object model controllers implement a materials-handling object model similar to those described in U.S. application Ser. No. 09/305,830, filed on May 5, 1999, which is incorporated by reference herein. One such object model controller is implemented in Impressionist™ materials-handling software, available from Symyx Technologies, Inc. of Santa Clara, Calif.). Those of ordinary skill in the art will recognize that other object models and/or object model controllers can be implemented using conventional programming techniques.

TABLE 1

HKEY_CLASSES_ROOT (hive)
    Object Model Controllers(list,key)
        CustomID(for each Object Model Controller)
            Object Model Controller Name(value)
            CATIDs (list,key)
                CATID(key)
                (multi)
    Component Categories
        CATID
            ElectiveInterfaces (list, contains interfaces that
            the user can implement in the VBA coclass,key)
                IID(key)
                    (default)Interface Name(value)
                (multi)
            Mandatory Implemented Interfaces(list, contains
            interfaces that must be implemented in the coclass
            and which are supplied to user)
                IID(key)
                    (default)Interface Name(value)
                    CLSID(Of implementation of the
                    interface,value)
                (multi)
            Mandatory Non-Implemented Interfaces(list,
            contains interfaces that must be implemented in
            the coclass, but which must be provided by the
            user)

TABLE 1-continued

```
IID(key)
        (default)Interface Name(value)
    (multi)
Mandatory Default Interfaces(list, includes
interfaces that will be supplied to user if no
implementation is provided)
    IID(key)
        (default)Interface Name(value)
        CLSID(Of default implementation of
        the interface,value)
    (multi)
Additional Designer Property Pages(list)
    CLSID(key)
    (multi)
Additional Type Libraries(list)
    TypeLib(key)
    (multi)
Threading Model(Value)
```

Upon receiving an instruction from the user to create an implementation of a coclass, client application 135 launches the design environment, loads an Add-In and passes the Add-In an object model controller ID (CATID) identifying the existing object model into which the new coclass is to be integrated (step 400). The Add-In uses the CategoryID to retrieve from the registry a list of templated coclasses for the object model, which list is displayed to the user (step 405). The user selects a coclass type to create (step 410), and the Add-In gets a list of required and elective interfaces for the selected coclass type from the registry (step 415). Registry data also identifies context information (e.g., mandatory or default interfaces) to be aggregated before and after the coclass. Registry data can also include additional designer property pages, which can be used in customizing a coclass within the IDE before saving and/or making a project. In general, customizations are based on user selections in these property pages, which when implemented may, for example, programmatically inject code into the VBA coclass (e.g., through a coclass initialize method). Property pages may also permit binding of resources such as toolbar bitmaps into the compiled project dll. The Add-In displays an interface selection dialog, such as Interface Selection Dialog 1020 shown in FIG. 10B, discussed in more detail below, and the user selects the desired interfaces to be implemented in the new coclass from the list view (step 420)—for example, by marking the boxes corresponding to the desired interfaces in list 1026.

The Add-In gets from the registry a list of objects to be aggregated before and after the coclass and any additional designer property pages (step 425), and prompts the user for a project name, opening the named project or creating a new project if the named project does not exist (step 430). The Add-In creates an instance of the custom designer and creates a corresponding new VBA class in the specified VBA project (step 435). The Add-In reads the type libraries for the selected interfaces and inserts code skeletons into a code pane for the new VBA class, as shown in FIG. 10C (step 440). The Add-In adds "Implements" statements to the top of the code pane for each custom interface to be implemented by the new coclass. A code generator object generates property and method code skeletons for each interface to be implemented in the new VBA coclass.

The code generator object defines and implements an IVBACodeGenerator interface whose primary method is GenerateVBACode. GenerateVBACode takes an Interface ID in parameter, and searches in the registry for the type library containing the type information for that interface.

The method then loads the type library and programmatically accesses the type information for the interface using known (e.g., Microsoft-defined) methods. The method uses the type information to generate a code segment including code skeletons of all of the property and methods defined by the interface. The Add-In adds the resulting code skeletons to the code pane for each of the properties and methods in the coclass. The user adds any desired code to the provided skeletons, as shown in FIG. 10D.

Coclass design module 120 implements the code and any customizations from the designer property pages (step 445), and compiles and saves the project as illustrated in FIG. 4D (step 450). The Add-In adds the ProgID for each new Public Creatable class to a Select Case implementation in the ISymyxVbaClassFactory::CreateInstance method in the Designer (step 455), and adjusts the project dll Type Library and registry settings as will be described in more detail below (step 460).

When the user instructs coclass design module 120 to compile the project (e.g., by selecting the Make entry in the File menu within the VBA IDE), the designer adds the custom code to the designer instance in the VBA IDE including the ISymyxVbaClassFactory::CreateInstance method which creates an instance of the VBA coclass and returns an automation reference to the instance. Next, the VBA IDE compiles the project into a project dll and performs standard VBA registration on the dll. Then the VBA IDE calls the IDesignerRegistration::GetRegistrationInfo method in the designer, which serializes custom registration data into a byte array, a pointer to which is passed to the DllRegisterDesigner for custom registration. Finally, the VBA IDE calls the DllRegisterDesigner function in the designer, which makes custom registry entries for the new coclass as set out in Table 2.

TABLE 2

```
HKEY_CLASSES_ROOT(hive)
    CLSID(key)
        (Default)  {ProgID}  (value)
        AppID  {AppID}}  (value)
        Description {ProgID} ( value added by the custom
        registration code)
        InsertCategory Custom( value added by the custom
        registration code)
        Resource ID( value added by the custom registration
        code)
        Additional Designer Property Pages( key added by the
        custom registration code)
            {CLSID}  (key)
                (Default)  (value not set) (value)
            {CLSID}  (key)
                (Default) (value not set) (value)
                (multi)
        Aggregate After( key added by the custom registration
        code)
            {CLSID}  (key)
                (Default)  (value not set) (value)
            {CLSID}  (key)
                (Default) (value not set) (value)
                (multi)
        Aggregate Before( key added by the custom registration
        code)
            {CLSID}  (key)
                (Default)  (value not set) (value)
            {CLSID}  (key)
                (Default) (value not set) (value)
                (multi)
        Implemented Categories
            {CATID  (Automation Objects set by VBE) (key)
                (Default)  (value not set) (value)
```

TABLE 2-continued

{CATID} (User selected CATID added by the custom
registration code) (key)
    (Default) (value not set) (value)
    (others)
InProcServer32( key added by the custom registration
code)
    (Default) {path}\VBACoclassWrapper.dll} (value)
    Threading Model
    {path}\VBACoclassWrapper.dll} (value)
ProgID(key)
    (Default) {ProgID} (value)
Programmable (key)
    (Default) (value not set) (value)
SymyxVBAClassFactory( key added by the custom
registration code)
    (Default) { CLSID } (value)
TypeLib(key)
    (Default) {LIBID} (value)
VERSION(key)
    (Default) {x.x} (key)

In this implementation, coclass design module 120 updates the registry settings for the VBA PublicCreateable coclasses, adding four keys: (1) an InProcServer32 key having a string value identifying the path to an interception layer and a string value identifying the threading model; (2) an ISymyxVbaClassFactory key having a string value identifying the class ID ("CLSID") of the instance of the designer in the VBA project; (3) an AggregateBefore key identifying (e.g., by CLSID) any coclasses to be aggregated by object instantiation module 130 before the new coclass is instantiated; (3) an AggregateAfter key identifying (again, e.g., by CLSID) any coclasses to be aggregated by object instantiation module 130 after the new coclass is instantiated. Three values are added to the default key: a string value of a menu insert category; a string value of a menu description (e.g., used for a menu or toolbar button caption); and a numeric value identifying resource ID to access resources bound into the project dll (e.g., used to access a toolbar button bitmap).

Next, DllRegisterDesigner also updates the bound dll type library by loading the bound type library and accessing its ITypeLib interface. It then creates a temporary type library file that is essentially a clone of the bound one, iterating through the bound type library and copying the type information using the ICreateTypeLib and ICreateTypeInfo interfaces on the temporary type library file, setting the type flags for all of the new coclasses to PublicCreateable, and swapping the bound type library in the dll with the cloned type library by updating the resource section of the project dll.

The user can save the project to a disk file or to other storage, such as a database. When the project is saved (e.g., by selecting a Save entry in the File menu, the design-time environment serializes standard VBA project information into the storage location. The design-time environment then calls the IPersistStream::Save method in the designer, which serializes the context information into the project file.

The user can open a saved project as illustrated in FIG. 4E. When the user opens a saved project within the VBA IDE, the design-time environment deserializes the standard project information from the storage location and recreates the design-time instance of the designer and the coclasses. Next, the design-time environment calls the IPersistStream::Load method in the designer to deserialize the context information for the PublicCreateable coclasses.

When the user inserts/deletes the custom designer into/from a project within the design-time environment, or inserts/deletes a class into/from a project within the design-time environment, the VBCommandBarEvents::Click event handler in the Add-In and designer, respectively, add to or delete from the data caches in the Add-In and designer. When the user selects deleting a project from the VBA IDE, the Add-In's VBProjectsEvents::ProjItemRemoved handler removes the project's custom settings in the data structures in the Add-In.

FIG. 5 illustrates an object instantiation method 500 for a coclass created according to method 300. To begin the method, the user launches client application 135 (or 137) on computer system 110 (step 510). Object instantiation module 130 receives an instruction to instantiate an object from a PublicCreatable coclass (step 520), and in response system 100 loads a class factory object (step 530). System 100 creates a wrapper object (step 540), and adds to the wrapper object any objects to be aggregated before the new custom object (e.g., objects implementing any mandatory interfaces) (step 550) and an instance of the specified custom class (step 560). System 100 puts a reference to the wrapper object into the instance of the custom class object (step 570), and adds any objects to be aggregated after the new custom object (step 580). System 100 returns a reference to the wrapper object (step 590), and the new object is available for use in client applications 135, 137. The reference to the wrapper object permits code in the instance of the coclass to access any other interface in the aggregate.

Object instantiation module 130 creates coclass instances using known methods. Programs written in the C++ language use #import on the type library or libraries or #include on the Microsoft Interface Definition Language generated header files, which do component creation through the normal COM application programming interface calls. Visual Basic and VBA implementations add a reference to the project dll: the Add-In adds references to the type libraries of implemented interfaces, and instances are created through the CreateObject call or the New operator. Scripting clients instantiate the objects with a CreateObject call.

FIG. 6 illustrates one implementation of a custom object instantiation sequence in more detail. In response to a user's request to instantiate a VBA coclass, the object instantiation module 130 gets the CLSID key for the specified coclass. The DllGetClassObject method in the VbaCoclassWrapper component dll caches the CLSID in a global variable and returns the context wrapper class factory, which creates an instance of the context wrapper. The VbaCoclassWrapperObj's FinalConstruct method initializes the VBA multithreaded runtime and creates all objects specified by the context information in the following order: AggregateBefore, VBA coclass, AggregateAfter. As each object is created, a reference to the object is added to a vector that is cached in the wrapper object. The vector is used in the VbaCoclassWrapperObj's QueryInterface method to maintain sequence in obtaining and caching interface pointers to the created objects. The result is a custom implementation of aggregation. Because VBA classes do not natively support aggregation, VbaCoclassWrapperObj's FinalConstruct sets a reference to the outer wrapper object into the VBA coclass instance programmatically (user code in the coclass module in the VBA project cannot cache this reference).

FIG. 7 shows the layout of the internal objects in the wrapper object, created in the order indicated in the FinalConstruct method illustrated in FIG. 6. A vector maintains a reference to all the aggregated objects and the wrapper's object implementation of the QueryInterface function queries for an interface in the order of creation. A flyweight object is created and cached for each interface the first time a client application calls VbaCoclassWrapperObj::QueryInterface for that interface. The flyweight object caches a pointer to the vtable for the corresponding interface in the aggregated object and has a custom vtable. Calls to IUnknown on a flyweight object delegate to the wrapper object. Calls to IDispatch are delegated to the ITypeInfo interface for the cached interface and custom vtable calls are routed to the vtable of the cached interface after the "this" pointer for the flyweight object on the call stack is replaced with the "this" pointer of the cached interface.

VBA coclasses can implement more than one dual interface, but Automation clients can normally only access the default interface of a coclass. The multiple dual interface implementation in VbaCoclassWrapperObj allows Automation clients to access all of the dual interfaces of a VBA coclass.

System 100 implements multiple dual interfaces through the CNestedDispatch and CFlyweightDispatch.classes in NestedDispatch.h, as is illustrated in FIGS. 8 and 9. Normally, an automation object can only support one automation interface (the default interface). Additional automation objects are returned as a property or the out parameter on a method of the default interface such as in a standard automation hierarchy. In one implementation, a flyweight object is created for each non-default interface on demand and cached so that the flyweight object is available for both early and late bound automation calls as well as vtable calls, and includes a custom vtable. The first seven entries in the vtable contain addresses to methods that pass the IUnknown and IDispatch methods to the flyweight object. The IUnknown implementations delegate to the controlling unknown's methods except that calling QueryInterface for the IDispatch interface returns the flyweight's object IDispatch interface. For vtable calls of the methods of a custom interface, the custom vtable entry calls an assembler method that swaps the "this" pointer on the call stack with the pointer to vtable of the custom interface as implemented in an aggregated object such as the VBA class instance. The flyweight object caches this interface pointer as a fixed offset into the flyweight object. The flyweight object also caches the ITypeInfo pointer for the custom interface in the aggregated object so that the flyweight object can delegate the IDispatch calls to it. The use of the ITypeInfo interface enables the generic implementation of the IDispatch interface through the flyweight object.

The CNestedDispatch class implements IDispatch on behalf of the default interface in VbaCoclassWrapperObj. A derived implementation of CComObject (CMultiDispComObject) provides an implementation of IUnknown::QueryInterface that returns a pointer to a flyweight object for a nondefault interface after either getting the cached pointer or creating a new flyweight object on behalf of the nondefault interface. The CNestedDispatch holds the list of cached flyweight objects and the creation/initialization code.

The implementation in VbaCoclassWrapperObj is essentially a custom implementation of aggregation. The implementation of the multi-dual interfaces is embedded in the classes CNestedDispatch and CFlyweightDispatch and is not dependent on the custom aggregation. The CVbaCoclassWrapperObj uses those classes to provide interface pointers to clients, but the IUnknown::QueryInterface implementation is provided by a CMultiDispComObject that handles the custom aggregation. The CNestedDispatch and CFlyweightDispatch classes are useable in coclass implementations that do not use the custom aggregation implementation and are therefore independent of CVbaCoclassWrapperObj. Because one of the aggregated objects in VbaCoclassWrapperObj can be an ActiveX Template Library (ATL) implemented coclass that may use the multiple dual interfaces implementation, the ATL coclass has the option of a preprocessor switch that does not use the multidisp implementation when it is aggregated. Otherwise a multiple dual interfaces implementation would be provided by both the object and by VbaCoclassWrapperObj on behalf of the object or stipulate that such objects never derive from CNestedDispatch.

FIGS. 10A–F illustrate a user interface for the various components of an implementation of system 100 in the context of an automated process control system such as those disclosed in U.S. patent application Ser. No. 09/305,830, filed on May 5, 1999, incorporated by reference above, and U.S. patent application Ser. No. 09/550,549, filed on Apr. 14, 2000, which is also incorporated by reference herein. Scientists and engineers can use such systems to implement customized laboratory protocols by, for example, defining a logical sequence of actions that interact with a set of hardware resources. Internally, actions and resources in such systems can be implemented as COM objects that make their capabilities available to the outside world through a set of well-defined interfaces. Thus, for example, a resource object can control a stream selection valve (such as those available from Valco Instruments Co. Inc. of Houston, Tex.), and can make the valve's capabilities available through an IValve interface defined as follows:

```
interface IValve : IDispatch
{
    [propget] HRESULT Positions([out, retval] long *pVal);
    [propput] HRESULT Position([in] long newVal);
    [propget] HRESULT Position([out, retval] long *pVal);
    HRESULT Initialize( );
    HRESULT Wait( );
};
```

Through this interface, clients of the valve resource can control the operation of the valve, including, for example, determining the number of discrete positions supported by the valve; determining the current valve position; commanding the valve to a position; initializing the valve; and/or waiting for the valve to reach a commanded position. A corresponding set of action objects can be provided to manipulate the valve by invoking properties and methods on the IValve interface.

For example, a "Set Valve Position" action object can move the valve to a new position by setting the valve's "Position" property. Preferably, the "Set Valve Position" object has no knowledge of the inner workings of the particular valve; instead, the generic characteristics of a stream selection valve are abstracted into the IValve interface. This permits programmers and/or users to develop new valve resources (and, by analogy, other resources and/or actions), and allows those new resources to be used transparently by existing valve actions, so long as the new resource implements the IValve interface. In addition, since the resources and actions are implemented as COM objects, the new resource can be implemented in a separate DLL and made available to the rest of the application by registering the DLL with the operating system. The rest of the application's code base remains untouched by the addition of the new resource. This modularity promotes extensibility and maintainability.

To create a custom coclass, the user first selects the Create VBA Coclass button 1010 in window 1000. Coclass design module 120 displays an Interface Selection Dialog 1020 on output device 160. The user selects an object model controller and a custom object type (e.g., a Resource type defining a device driver for controlling an apparatus 180 or an Action type defining an action to be performed by apparatus control system 170) from dropdown lists 1022 and 1024, respectively, and selects one or more interfaces from list 1026 for implementation in the custom object. After the user enters a new project name or selects an existing project file, system 100 launches the VBA IDE, creates or opens the specified project, and creates an instance of the custom designer and a new class. The code generator generates code skeletons 1032 for each property and method of the selected interfaces, which are displayed in code pane 1030. The user then adds custom code 1040 and saves the project. Once coclass design module 120 compiles the project file into a project dll, the new custom coclass is available as an entry 1050 in the list 1055 of available objects in the object model environment (implemented in client applications 135, 137). Selection of the custom coclass entry in client applications 135, 137 causes object instantiation module 130 to create an instance of the coclass, for example, the custom valve object 1060 shown in FIG. 10F. Although FIGS. 10A–F illustrate a graphical-user-interface based implementation of system 100, those of ordinary skill in the art will recognize that comparable functionality could readily be implemented in a non-graphical environment using known programming techniques.

To continue the process control example, assume a user desires to add support for a new (hypothetical) "XYZ" stream selection valve. After initiating the client application, the user selects button 1010 to create a custom coclass and selects "Impressionist Object Model Controller" and "Symyx Impressionist Custom Resource" from the dropdown lists 1022 and 1024 in the resulting dialog. A list of interfaces is displayed from which the user can choose.

Some interfaces must be implemented in order for the object to work with the specified object model controller. In this example, the INode interface must be implemented, because it provides the properties and methods used by client application to display, modify and persist the object. Mandatory interfaces are selected and grayed-out to prevent de-selection by the user. While the INode interface is mandatory, the user does not need to implement it because the client application provides an implementation of INode by aggregating another coclass that provides the INode interface. Thus, much of the complexity involved in creating a resource is completely hidden from the user.

Other interfaces are elective and must be selected based on the type of resource being implemented. In this example, the user selects the IValve interface (and clicks "OK"). The client application responds by creating a new coclass project that includes skeleton source code for a class that implements the selected elective interfaces. At this point, the user could save and compile the project, and the new resource would be available for use by the valve-related actions in the client application. It would perform no useful function, however, since the implementation is empty. The specific programming necessary to interface with the actual device is provided by the user.

In this example, objects will typically have associated properties (displayed in the left hand pane of the object editor when the object is selected), through which the user can customize or configure the object. Thus, for example, a valve resource may have properties for specifying the valve's address and number of positions. This property information is managed by the aggregated coclass implementing INode (and can be included in object representations—e.g., in XML—so property settings can be persisted). Properties can be added to custom coclasses in the Class_Initialize method (as illustrated in FIG. 10D). The global variable "TheContextObject" provides a mechanism by which the custom coclass can access its aggregated coclasses. Once the INode interface pointer has been obtained, property objects (m_Address and m_NumPositions in this case) can be created, configured, and added to the INode properties collection. Coclass properties can be created, deleted and configured using, e.g., a property editor incorporated in the VBA environment. An analogous process can be followed to create a custom action (or, indeed, some other coclass in a corresponding environment), except that the list of available interfaces will be different (e.g., action objects may be required to implement an IAction interface).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. The custom objects of the invention can be implemented as component objects implementing an appropriate interface or interfaces in a component software architecture such as Microsoft Corporation's Component Object Model (COM) or Distributed Component Object Model (DCOM) or NET standards, or the Object Management Group's Common Object Request Broker Architecture (CORBA) standard, or the Simple Object Access Protocol (SOAP) or related HTTP based protocols. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. For example, although coclass design module 120 has been described as being implemented in Visual Basic for Applications, the functionality of that program can be implemented in other programming environments. Similarly, although the custom object definition and instantiation features have been described in the context of an automated process control object model, those features can be advantageously applied to the extension of other object models and the implementation of other templated domain object types as well, such as, for example and without limitation, non-GUI server-side business logic and data access components, domain model objects, and client side GUI forms. Accordingly, other embodiments are within the scope of the following claims.

What is claimed is:

1. A computer-implemented programming method, comprising:

providing a runtime environment including a client application implementing an object model, the object model including a hierarchy of object classes capable of being instantiated in the client application, the object model also including one or more class templates, each class template having an associated class type and including class functionality information for a custom class capable of being implemented in the client application, the class functionality information for each class template including a set of required class functionality for the associated class type and a set of elective class functionality for the associated class type;

receiving in the client application a first user input including a custom class creation request specifying a class type for a custom class;

in response to the first user input, launching a design-time environment for defining custom object classes;

retrieving the class functionality information for the class template associated with the specified class type;

receiving in the design-time environment a second user input specifying a subset of the elective class functionality to be implemented in the custom class; and generating in the design-time environment a class definition defining a custom class having the required class functionality and the specified elective class functionality, wherein objects belonging to the custom class are capable of being instantiated from the runtime environment independent of the design-time environment.

2. The method of claim 1, wherein:

the class functionality information includes information identifying a set of mandatory interfaces defining the required class functionality for the associated class type and information identifying a set of elective interfaces defining the elective class functionality for the associated class type.

3. The method of claim 2, further comprising:

after retrieving the class functionality information for the class template associated with the specified class type, displaying to the user a list of the set of elective interfaces defining the elective class functionality for the associated class type; and wherein receiving the second user input includes receiving a user selection of one or more of the elective interfaces from the displayed list of elective interfaces.

4. The method of claim 3, wherein:

generating the class definition includes aggregating a plurality of objects implementing the mandatory interfaces and the selected elective interfaces.

5. The method of claim 4, wherein each of the elective interfaces has a set of associated interface properties and interface methods, the method further comprising:

receiving in the design-time environment a third user input including one or more code fragments further defining one or more of the interface properties and/or interface methods associated with at least one of the selected elective interfaces.

6. The method of claim 5, further comprising:

generating code skeletons for one or more of the interface properties and interface methods associated with the selected elective interfaces, each code skeleton being derived from object metadata describing the specified elective interface that is associated with the interface property or interface method; and displaying the code skeletons to the user.

7. The method of claim 1, wherein:

the design-time environment includes a graphical user interface; and the runtime environment is independent of the graphical user interface.

8. The method of claim 1, further comprising:

instantiating an object of the custom class in the runtime environment.

9. The method of claim 8, wherein:

the class definition is generated as a dynamic linked library; and instantiating the object includes calling the dynamic linked library in the runtime environment.

10. The method of claim 9, wherein:

the runtime environment includes a wrapper object operable to execute code in the dynamic linked library.

11. The method of claim 1, wherein:

the client application is an automated process control program and the custom class is a resource class for defining an apparatus driver for an apparatus coupled to the automated process control program.

12. The method of claim 1, wherein:

the client application is an automated process control program and the custom class is an action class for defining an action capable of being implemented by the automated process control program.

13. A computer program product on a computer-readable medium for generating custom object classes, the program comprising instructions operable to cause a programmable processor to:

provide a runtime environment including a client application implementing an object model, the object model including a hierarchy of object classes capable of being instantiated in the client application, the object model also including one or more class templates, each class template having an associated class type and including class functionality information for a custom class capable of being implemented in the client application, the class functionality information for each class template including a set of required class functionality for the associated class type and a set of elective class functionality for the associated class type;

receive in the client application a first user input including a custom class creation request specifying a class type for a custom class;

in response to the first user input, launch a design-time environment for defining custom object classes;

retrieve the class functionality information for the class template associated with the specified class type;

receive in the design-time environment a second user input specifying a subset of the elective class functionality to be implemented in the custom class; and generate in the design-time environment a class definition defining a custom class having the required class functionality and the specified elective class functionality, wherein objects belonging to the custom class are capable of being instantiated from the runtime environment independent of the design-time environment.

14. The computer program product of claim 13, wherein:

the class functionality information includes information identifying a set of mandatory interfaces defining the required class functionality for the associated class type and information identifying a set of elective interfaces defining the elective class functionality for the associated class type.

15. The computer program product of claim 14, further comprising instructions operable to cause a programmable processor to:

after retrieving the class functionality information for the class template associated with the specified class type, display to the user a list of the set of elective interfaces defining the elective class functionality for the associated class type; and wherein the instructions to receive the second user input include instructions operable to cause the programmable processor to receive a user selection of one or more of the elective interfaces from the displayed list of elective interfaces.

16. The computer program product of claim 15, wherein:

the instructions to generate the class definition include instructions operable to cause a programmable processor to aggregate a plurality of objects implementing the mandatory interfaces and the selected elective interfaces.

17. The computer program product of claim 16, wherein each of the elective interfaces has a set of associated interface properties and interface methods, the computer program product further comprising instructions operable to cause a programmable processor to:

receive in the design-time environment a third user input including one or more code fragments further defining one or more of the interface properties and/or interface methods associated with at least one of the selected elective interfaces.

18. The computer program product of claim 17, further comprising instructions operable to cause a programmable processor to:

generate code skeletons for one or more of the interface properties and interface methods associated with the selected elective interfaces, each code skeleton being derived from object metadata describing the specified elective interface that is associated with the interface property or interface method; and display the code skeletons to the user.

19. The computer program product of claim 13, wherein:

the design-time environment includes a graphical user interface; and the runtime environment is independent of the graphical user interface.

20. The computer program product of claim 13, further comprising instructions operable to cause a programmable processor to:

instantiate an object of the custom class in the runtime environment.

21. The computer program product of claim 20, wherein:

the class definition is generated as a dynamic linked library; and the instructions to instantiate the object include instructions operable to cause the programmable processor to call the dynamic linked library in the runtime environment.

22. The computer program product of claim 21, wherein:

the runtime environment includes a wrapper object operable to execute code in the dynamic linked library.

23. The computer program product of claim 13, wherein:

the client application is an automated process control program and the custom class is a resource class for defining an apparatus driver for an apparatus coupled to the automated process control program.

24. The computer program product of claim 13, wherein:

the client application is an automated process control program and the custom class is an action class for defining an action capable of being implemented by the automated process control program.

25. A computer-implemented custom class design system, comprising:

means for providing a runtime environment including a client application implementing an object model, the object model including a hierarchy of object classes capable of being instantiated in the client application, the object model also including one or more class templates, each class template having an associated class type and including class functionality information for a custom class capable of being implemented in the client application, the class functionality information for each class template including a set of required class functionality for the associated class type and a set of elective class functionality for the associated class type;

means for providing, in response to a first user input including a custom class creation request specifying a class type for a custom class, a design-time environment for defining custom object classes;

means for retrieving the class functionality information for the class template associated with the specified class type and receiving in the design-time environment a second user input specifying a subset of the elective class functionality to be implemented in the custom class; and means for generating in the design-time environment a class definition defining a custom class having the required class functionality and the specified elective class functionality, wherein objects belonging to the custom class are capable of being instantiated from the runtime environment independent of the design-time environment.

* * * * *